(12) United States Patent
Ninan et al.

(10) Patent No.: US 8,199,401 B2
(45) Date of Patent: Jun. 12, 2012

(54) N-MODULATION DISPLAYS AND RELATED METHODS

(75) Inventors: Ajit Ninan, San Jose, CA (US); Helge Seetzen, Vancouver, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 307 days.

(21) Appl. No.: 12/565,046

(22) Filed: Sep. 23, 2009

(65) Prior Publication Data

US 2010/0007577 A1    Jan. 14, 2010

Related U.S. Application Data

(63) Continuation of application No. 11/831,864, filed on Jul. 31, 2007, now Pat. No. 7,777,945, which is a continuation of application No. 10/507,460, filed as application No. PCT/CA03/00350 on Mar. 13, 2003, now Pat. No. 7,403,332.

(60) Provisional application No. 60/363,563, filed on Mar. 13, 2002.

(51) Int. Cl.
*G03B 21/56* (2006.01)
(52) U.S. Cl. ............. 359/443; 353/30; 345/55; 345/102
(58) Field of Classification Search .................. 359/443, 359/449; 353/51, 61, 30–31; 345/51, 55, 345/102
See application file for complete search history.

(56) References Cited

U.S. PATENT DOCUMENTS

| | | | |
|---|---|---|---|
| 4,170,771 A | 10/1979 | Bly | |
| 4,229,095 A | 10/1980 | Mir | |
| 4,316,196 A | 2/1982 | Jacobs | |
| 4,364,039 A | 12/1982 | Penz | |
| 4,374,397 A | 2/1983 | Mir | |
| 4,378,568 A | 3/1983 | Mir | |
| 4,441,791 A | 4/1984 | Hornbeck | |
| 4,559,480 A | 12/1985 | Nobs | |
| 4,580,877 A | 4/1986 | Washo | |
| 4,637,150 A | 1/1987 | Geluk | |
| 4,726,663 A | 2/1988 | Buzak | |
| 4,801,194 A | 1/1989 | Agostinelli et al. | |
| 4,853,824 A * | 8/1989 | Tsuzurahara | 361/302 |
| 4,868,668 A | 9/1989 | Tavernetti | |
| 4,933,754 A | 6/1990 | Reed et al. | |
| 4,954,789 A | 9/1990 | Sampsell | |
| 4,987,410 A | 1/1991 | Berman et al. | |
| 4,995,719 A | 2/1991 | Shanks | |

(Continued)

FOREIGN PATENT DOCUMENTS

EP    0730371 A2    9/1996

(Continued)

OTHER PUBLICATIONS

Funamoto et al., High-Picture-Quality Technique for LCD Televisions: LCD-A, FMC6-4 (Late-News Paper), 2000.

(Continued)

*Primary Examiner* — Christopher Mahoney

(57) ABSTRACT

A display has a light source, a spatial light modulator and an intermediate spatial light modulator. The display may be a front projection display or a rear-projection display. The spatial light modulator is illuminated with light from a light source. The intermediate spatial light modulator is located in a light path between the light source and the spatial light modulator. The light source may comprise an array of controllable light-emitters. The display may provide a high dynamic range.

41 Claims, 22 Drawing Sheets

U.S. PATENT DOCUMENTS

| | | | |
|---|---|---|---|
| 5,029,967 A | 7/1991 | Livezey et al. | |
| 5,075,789 A | 12/1991 | Jones et al. | |
| 5,103,328 A | 4/1992 | Numao | |
| 5,122,791 A | 6/1992 | Gibbons et al. | |
| 5,144,292 A | 9/1992 | Shiraishi et al. | |
| 5,247,366 A | 9/1993 | Ginosar et al. | |
| 5,359,345 A | 10/1994 | Hunter | |
| 5,386,253 A | 1/1995 | Fielding | |
| 5,422,691 A | 6/1995 | Ninomiya et al. | |
| 5,504,504 A | 4/1996 | Markandey et al. | |
| 5,537,233 A | 7/1996 | Miura et al. | |
| 5,537,256 A | 7/1996 | Fergason | |
| 5,572,341 A | 11/1996 | Fergason | |
| 5,592,193 A | 1/1997 | Chen | |
| 5,639,158 A | 6/1997 | Sato | |
| 5,646,702 A | 7/1997 | Akinwande et al. | |
| 5,652,672 A | 7/1997 | Huignard et al. | |
| 5,666,226 A | 9/1997 | Ezra et al. | |
| 5,684,354 A | 11/1997 | Gleckman | |
| 5,715,029 A | 2/1998 | Fergason | |
| 5,717,422 A | 2/1998 | Fergason | |
| 5,724,062 A | 3/1998 | Hunter | |
| 5,729,242 A | 3/1998 | Margerum et al. | |
| 5,748,828 A | 5/1998 | Steiner et al. | |
| 5,784,181 A | 7/1998 | Loiseaux et al. | |
| 5,809,215 A | 9/1998 | Heydinger et al. | |
| 5,815,303 A | 9/1998 | Berlin | |
| 5,889,567 A | 3/1999 | Swanson et al. | |
| 5,892,325 A | 4/1999 | Gleckman | |
| 5,926,239 A | 7/1999 | Kumar et al. | |
| 5,959,777 A | 9/1999 | Whitehead | |
| 5,978,142 A * | 11/1999 | Blackham et al. | 359/618 |
| 5,986,628 A | 11/1999 | Tuenge et al. | |
| 6,043,591 A | 3/2000 | Gleckman | |
| 6,111,559 A | 8/2000 | Motomura et al. | |
| 6,111,560 A | 8/2000 | May | |
| 6,120,588 A | 9/2000 | Jacobson | |
| 6,120,839 A | 9/2000 | Comiskey et al. | |
| 6,144,162 A | 11/2000 | Smith | |
| 6,163,621 A | 12/2000 | Paik et al. | |
| 6,172,798 B1 | 1/2001 | Albert et al. | |
| 6,184,969 B1 | 2/2001 | Fergason | |
| 6,215,920 B1 | 4/2001 | Whitehead et al. | |
| 6,229,588 B1 | 5/2001 | Abileah et al. | |
| 6,243,055 B1 | 6/2001 | Fergason | |
| 6,243,068 B1 | 6/2001 | Evanicky et al. | |
| 6,268,843 B1 | 7/2001 | Arakawa | |
| 6,276,801 B1 | 8/2001 | Fielding | |
| 6,300,932 B1 | 10/2001 | Albert | |
| 6,323,989 B1 | 11/2001 | Jacobson et al. | |
| 6,327,072 B1 | 12/2001 | Comiskey et al. | |
| 6,381,372 B1 | 4/2002 | Loce | |
| 6,414,661 B1 | 7/2002 | Shen et al. | |
| 6,428,189 B1 | 8/2002 | Hochstein | |
| 6,435,691 B1 | 8/2002 | Macey et al. | |
| 6,437,769 B1 | 8/2002 | Kobayashi et al. | |
| 6,439,731 B1 | 8/2002 | Johnson et al. | |
| 6,448,951 B1 | 9/2002 | Sakaguchi et al. | |
| 6,448,955 B1 | 9/2002 | Evanicky et al. | |
| 6,483,643 B1 | 11/2002 | Zuchowski | |
| 6,520,646 B2 | 2/2003 | Rodriguez, Jr. et al. | |
| 6,590,561 B1 | 7/2003 | Kabel et al. | |
| 6,608,614 B1 | 8/2003 | Johnson | |
| 6,621,482 B2 | 9/2003 | Fuller | |
| 6,631,995 B2 | 10/2003 | Stanton et al. | |
| 6,644,832 B2 | 11/2003 | Yoshida et al. | |
| 6,654,156 B1 | 11/2003 | Crossland et al. | |
| 6,657,607 B1 | 12/2003 | Evanicky et al. | |
| 6,671,008 B1 * | 12/2003 | Li et al. | 349/16 |
| 6,680,834 B2 | 1/2004 | Williams | |
| 6,683,657 B1 | 1/2004 | Miyawaki | |
| 6,728,023 B1 | 4/2004 | Alioshin et al. | |
| 6,753,661 B2 | 6/2004 | Muthu et al. | |
| 6,796,658 B2 | 9/2004 | Hubel et al. | |
| 6,803,901 B1 | 10/2004 | Numao | |
| 6,816,141 B1 | 11/2004 | Fergason | |
| 6,817,717 B2 | 11/2004 | Childers et al. | |
| 6,831,624 B1 | 12/2004 | Harrold | |
| 6,831,711 B2 | 12/2004 | Choi et al. | |
| 6,863,401 B2 | 3/2005 | Penn | |
| 6,888,663 B2 | 5/2005 | Bourdelais et al. | |
| 6,891,672 B2 | 5/2005 | Whitehead | |
| 6,952,195 B2 | 10/2005 | Arakawa | |
| 6,980,176 B2 | 12/2005 | Matsumoto et al. | |
| 6,980,195 B2 | 12/2005 | Lonoce et al. | |
| 6,985,272 B2 | 1/2006 | Bridgwater et al. | |
| 7,002,533 B2 | 2/2006 | Sayag | |
| 7,018,046 B2 | 3/2006 | Childers et al. | |
| 7,050,122 B2 | 5/2006 | Gibbon et al. | |
| 7,052,152 B2 | 5/2006 | Harbers et al. | |
| 7,053,881 B2 | 5/2006 | Itoh | |
| 7,064,740 B2 | 6/2006 | Daly | |
| 7,071,907 B1 | 7/2006 | Duboc, Jr. et al. | |
| 7,106,505 B2 | 9/2006 | Whitehead et al. | |
| 7,118,225 B2 | 10/2006 | Penn | |
| 7,172,297 B2 | 2/2007 | Whitehead et al. | |
| 7,175,281 B1 | 2/2007 | Berman | |
| 7,403,332 B2 | 7/2008 | Whitehead et al. | |
| 7,413,309 B2 | 8/2008 | Whitehead et al. | |
| 7,532,192 B2 | 5/2009 | Feng | |
| 2001/0019390 A1 | 9/2001 | Itoh et al. | |
| 2001/0035853 A1 | 11/2001 | Hoelen et al. | |
| 2001/0043179 A1 | 11/2001 | Yoshinaga et al. | |
| 2002/0003522 A1 | 1/2002 | Baba et al. | |
| 2002/0050958 A1 | 5/2002 | Matthies et al. | |
| 2002/0057238 A1 | 5/2002 | Nitta et al. | |
| 2002/0135553 A1 | 9/2002 | Nagai et al. | |
| 2002/0159002 A1 | 10/2002 | Chang | |
| 2002/0163606 A1 | 11/2002 | Kitai et al. | |
| 2002/0171617 A1 | 11/2002 | Fuller | |
| 2003/0048393 A1 | 3/2003 | Sayag | |
| 2003/0090455 A1 | 5/2003 | Daly | |
| 2003/0137501 A1 | 7/2003 | Richards | |
| 2003/0151569 A1 | 8/2003 | Lee et al. | |
| 2003/0206245 A1 | 11/2003 | Lin et al. | |
| 2004/0012551 A1 | 1/2004 | Ishii | |
| 2004/0218388 A1 | 11/2004 | Suzuki | |
| 2005/0083295 A1 | 4/2005 | Daly | |
| 2005/0083296 A1 | 4/2005 | Daly | |
| 2005/0162737 A1 | 7/2005 | Whitehead et al. | |
| 2005/0248554 A1 | 11/2005 | Feng et al. | |
| 2005/0285841 A1 | 12/2005 | Lin | |
| 2006/0028156 A1 | 2/2006 | Jungwirth | |
| 2006/0092183 A1 | 5/2006 | Malmberg | |
| 2006/0125745 A1 | 6/2006 | Evanicky | |
| 2006/0227085 A1 | 10/2006 | Boldt, Jr. et al. | |
| 2006/0232969 A1 | 10/2006 | Bogner et al. | |
| 2007/0024576 A1 | 2/2007 | Hassan | |
| 2007/0035706 A1 | 2/2007 | Margulis | |
| 2007/0097321 A1 | 5/2007 | Whitehead et al. | |
| 2007/0126992 A1 | 6/2007 | Penn | |
| 2007/0132956 A1 | 6/2007 | Whitehead et al. | |
| 2007/0146257 A1 | 6/2007 | Whitehead et al. | |
| 2007/0247833 A1 | 10/2007 | Lee et al. | |
| 2007/0268211 A1 | 11/2007 | Whitehead et al. | |
| 2007/0268224 A1 | 11/2007 | Whitehead et al. | |
| 2007/0268577 A1 | 11/2007 | Whitehead et al. | |
| 2008/0018985 A1 | 1/2008 | Whitehead et al. | |
| 2008/0030449 A1 | 2/2008 | Lee et al. | |
| 2008/0043034 A1 | 2/2008 | Whitehead et al. | |
| 2008/0043303 A1 | 2/2008 | Whitehead et al. | |
| 2008/0074060 A1 | 3/2008 | Ye et al. | |
| 2008/0150878 A1 | 6/2008 | Kang | |
| 2008/0150879 A1 | 6/2008 | Kang | |

FOREIGN PATENT DOCUMENTS

| | | |
|---|---|---|
| EP | 0829747 A1 | 3/1998 |
| EP | 1003064 A1 | 5/2000 |
| EP | 1098291 A2 | 5/2001 |
| EP | 1136874 A1 | 9/2001 |
| EP | 1202244 A1 | 5/2002 |
| EP | 1431653 A2 | 6/2004 |
| EP | 1521235 A2 | 4/2005 |
| FR | 2702299 | 9/1994 |
| FR | 2702299 A1 | 9/1994 |
| JP | 6054120 A2 | 4/1985 |
| JP | 6054174 A2 | 4/1985 |

| | | | |
|---|---|---|---|
| JP | 62-234185 A | 10/1987 |
| JP | 62234133 A2 | 10/1987 |
| JP | 02162389 A2 | 6/1990 |
| JP | HEI 3-71111 A2 | 3/1991 |
| JP | 3198026 A1 | 8/1991 |
| JP | 04204591 A2 | 7/1992 |
| JP | 07121120 A2 | 5/1995 |
| JP | 08334742 A1 | 12/1996 |
| JP | 09-189893 A | 7/1997 |
| JP | 10269802 A2 | 10/1998 |
| JP | 11052412 A | 2/1999 |
| JP | 11064820 A2 | 3/1999 |
| JP | 2000035576 A | 2/2000 |
| JP | 2000214827 A2 | 8/2000 |
| JP | 2000275595 A | 10/2000 |
| JP | 2001100689 A | 4/2001 |
| JP | 2002091385 A | 3/2002 |
| JP | 2002099250 A2 | 4/2002 |
| JP | 2002140338 A | 5/2002 |
| JP | 2005-520188 | 7/2005 |
| JP | 2009-053370 A | 3/2009 |
| WO | 91/15843 A2 | 10/1991 |
| WO | 96/33483 A1 | 10/1996 |
| WO | 99/19767 A1 | 4/1999 |
| WO | 00/23831 A1 | 4/2000 |
| WO | 00/40018 A1 | 7/2000 |
| WO | 00/75720 A2 | 12/2000 |
| WO | 01/69584 A1 | 9/2001 |
| WO | 01/69941 A2 | 9/2001 |
| WO | 02/03687 A2 | 1/2002 |
| WO | 02/069030 A2 | 9/2002 |
| WO | 02/079862 A2 | 10/2002 |
| WO | 03/077013 A2 | 9/2003 |
| WO | 2004031844 A1 | 4/2004 |
| WO | 2005/101309 A1 | 10/2005 |
| WO | 2006/010244 A1 | 2/2006 |
| WO | 2006115852 A2 | 11/2006 |

OTHER PUBLICATIONS

International Search Report and Written Opinion for PCT/US07/02788 filed Jan. 31, 2007.

Suzuki, Y., Liquid Crystal Applications, Television Technology Institute Reports, 1983.

Ohara, A. Backlight for Liquid Crystal Displays, J. Illum. Institute of Japan, 1989, vol. 73(12).

Mitsuhasi, Y. Regarding LED Backlight Systems for LCD's, Television Technology Institute Reports, 1996.

Endo, N., Transmissive Type Liquid Crystal Display Device, Toshiba Technology Presentation Collection, 1996.

Funamoto et al., Technology for LCD Televisions with High Image Quality, Matsushita Technical Journal, 2000, vol. 46(3).

Ward Greg, A Wide Field, High Dynamic Range, Stereographic Viewer, Apr. 2002.

Ward, Greg, A Wide-Field Stereoscopic High Dynamic Range Viewer, Mar. 30, 2001.

* cited by examiner

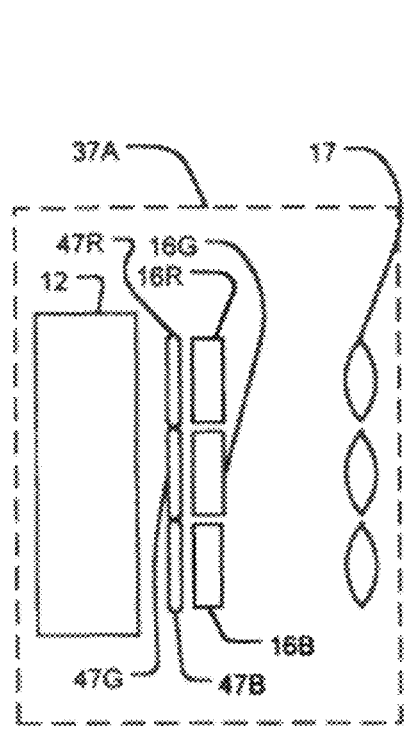
FIGURE 6
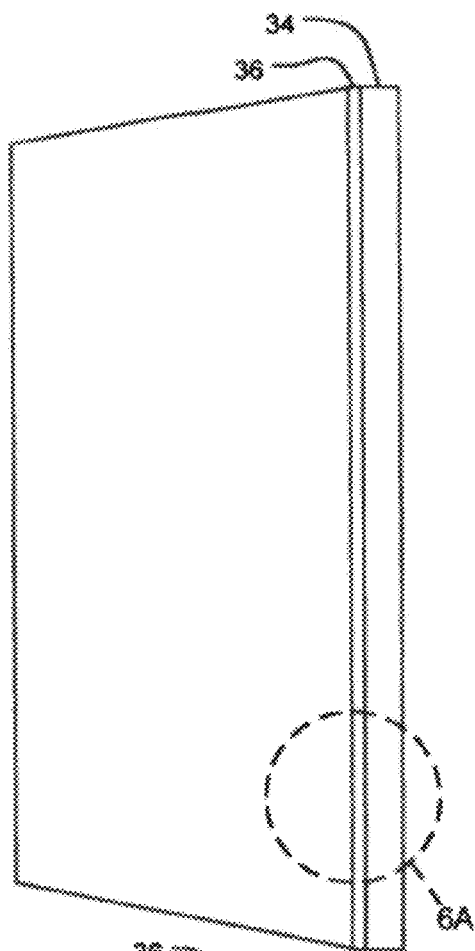
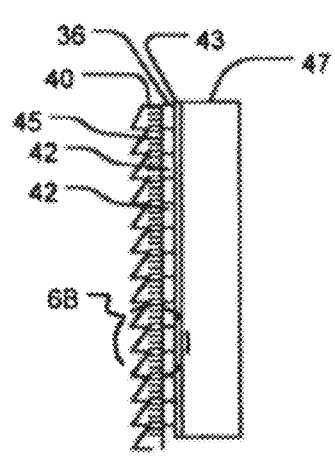
FIGURE 6A
FIGURE 6B

FIGURE 8C  FIGURE 8E

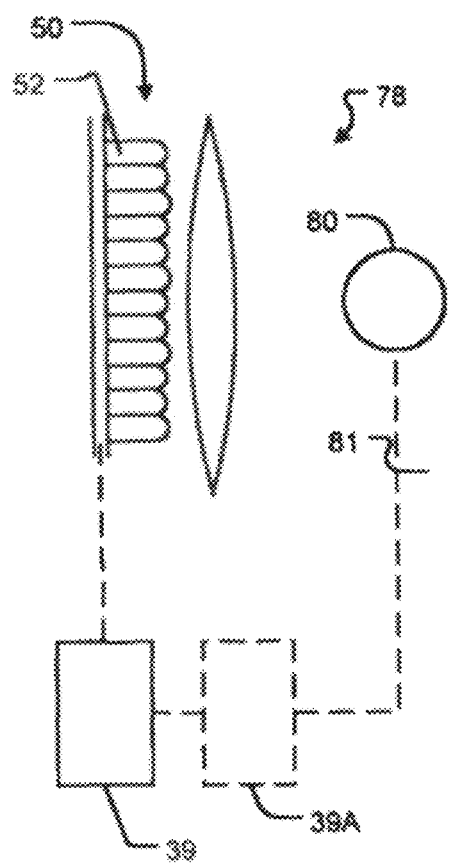
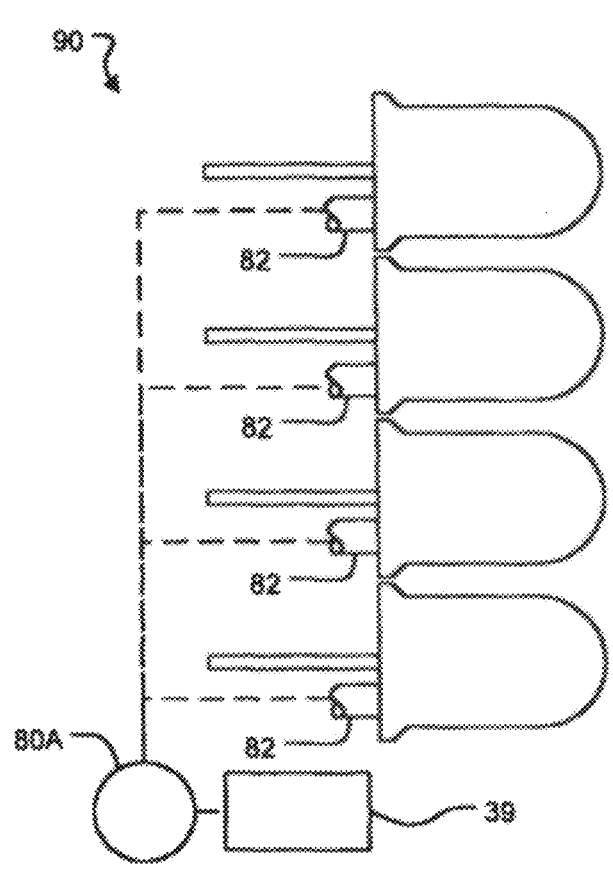
FIGURE 11  FIGURE 11B
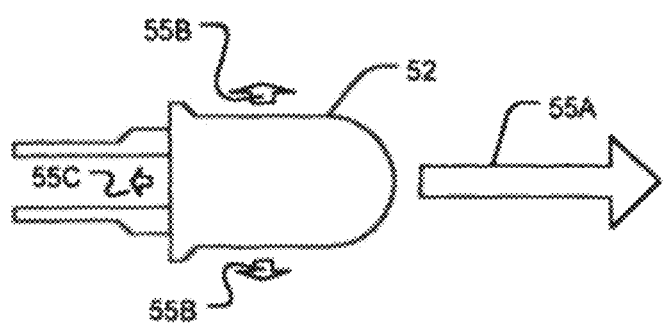
FIGURE 11A

N-MODULATION DISPLAYS AND RELATED METHODS

CROSS REFERENCE TO RELATED APPLICATIONS

This application is a continuation-in-part of U.S. Ser. No. 11/831,864 filed on 31 Jul. 2007, which is a continuation of U.S. patent application Ser. No. 10/507,460 (accorded filing date 10 Sep. 2004), which is the U.S. National Stage of International Application No. PCT/CA03/00350 filed 13 Mar. 2003, which claims the benefit of the filing date of U.S. provisional patent application No. 60/363,563 filed 13 Mar. 2002 and entitled HIGH DYNAMIC RANGE DISPLAY DEVICES.

TECHNICAL FIELD

The invention relates to displays for displaying images. The invention has application, for example, in computer displays, televisions, video monitors, digital cinema displays, specialized displays (for example, displays for medical images such as x-rays, ultrasound images CT scans and the like, and displays for flight simulation and virtual reality), advertising displays, and the like.

BACKGROUND

Displays of various types have become widespread. The capability of existing display technology to display high quality images is improving. There is still a need for practical and cost effective display technology.

Dynamic range is the ratio of intensity of the highest luminance parts of a scene and the lowest luminance parts of a scene. For example, the image projected by a video projection system may have a maximum dynamic range of 300:1. The human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadows. To create a realistic rendering of such scenes can require a display having a dynamic range in excess of 1000:1.

Modern digital imaging systems are capable of capturing and recording digital representations of scenes in which the dynamic range of the scene is preserved. Computer imaging systems are capable of synthesizing images having high dynamic ranges. There exists a need for cost effective displays capable of reproducing a wide range of light intensities in displayed images.

SUMMARY OF THE INVENTION

This invention provides displays for displaying images, controllers for displays, components for displays and methods for operating such displays.

One embodiment of the invention provides a display comprising: a spatial light modulator comprising a plurality of controllable elements located to modulate light from a light source. An intermediate spatial light modulator is provided in a light path between the light source and the spatial light modulator.

In embodiments the light source comprises an array of light-emitting elements. Each of the elements has a controllable light output. A diffuser may be provided to direct light from the light source which has been modulated by the intermediate spatial light modulator and the spatial light modulator to a viewing area.

Further aspects of the invention and features of specific embodiments of the invention are described below.

BRIEF DESCRIPTION OF THE DRAWINGS

The accompanying drawings illustrate non-limiting embodiments.

FIG. 6 is a schematic illustration of a front-projection-type color display having an alternative projector construction.

FIGS. 6A and 6B are expanded cross-sectional views of portions of the front-projection screen of the color display of FIG. 6.

FIG. 8C is a schematic view of a display having a grid interposed between an array of light sources and a spatial light modulator.

FIG. 8E is a schematic representation of one channel through a grid illustrating reflected and non-reflected light components impinging on a spatial light-modulator.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides displays capable of rendering images with high dynamic ranges. Displays according to the invention comprise two light modulating stages. Light passes through the stages in series to provide an image which has an increased dynamic range.

Figure 1:
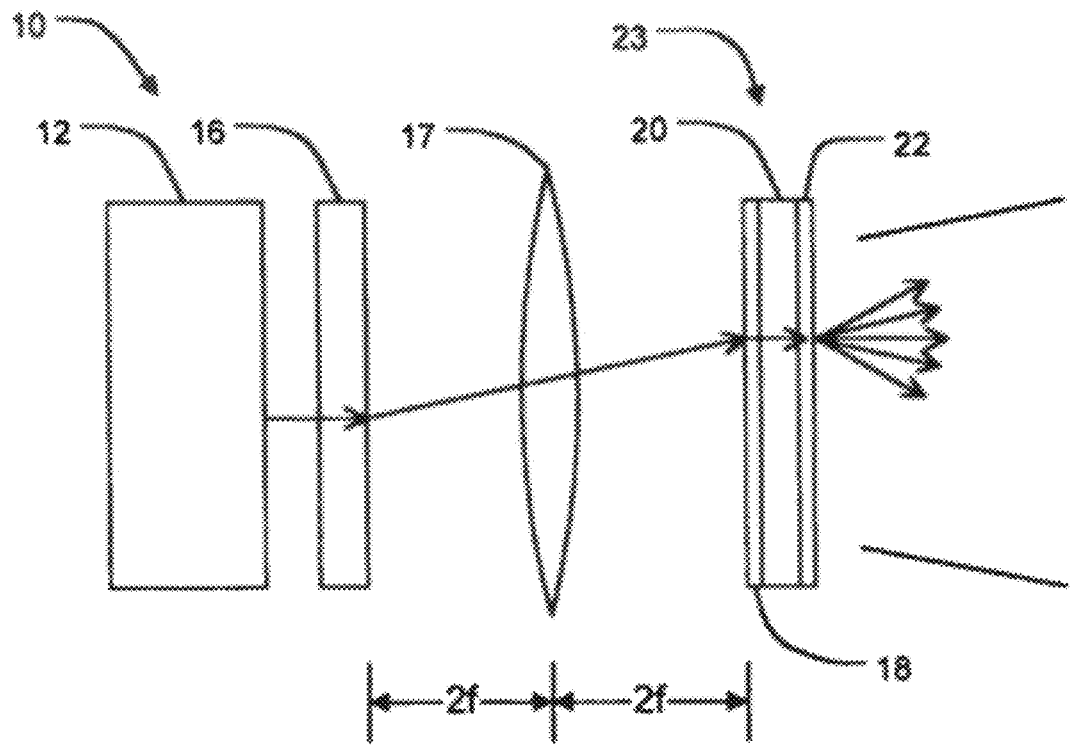
FIG. 1 is a schematic illustration of a display.

FIG. 1 illustrates schematically a display 10 according to a simple embodiment of the invention. The sizes of elements and distances between them in FIG. 1 are not to scale. Display 10 comprises a light source 12. Light source 12 may, for example, comprise a projection lamp such as an incandescent lamp or an arc lamp, a laser, or another suitable source of light. Light source 12 may comprise an optical system comprising one or more mirrors, lenses or other optical elements which cooperate to deliver light to the rest of display 10.

In the illustrated embodiment, light from light source 12 is directed toward a first light modulator 16. Light source 12 preferably provides substantially uniform illumination of first light modulator 16. Light modulator 16 comprises an array of individually addressable elements. Light modulator 16 may comprise, for example, a LCD (liquid crystal display), which is an example of a transmission-type light modulator or a DMD (deformable mirror device), which is an example of a reflection-type light modulator. Display driver circuitry (not shown in FIG. 1) controls the elements of light modulator 16 according to data which defines an image being displayed.

Light which has been modulated by first light modulator 16 is imaged onto a rear-projection screen 23 by a suitable optical system 17. Light from a small area of first light modulator 16 is directed by optical system 17 to a corresponding area on rear-projection screen 23. In the illustrated embodiment, optical system 17 comprises a lens having a focal length f. In general, the optical system 17 which images light modulated by first light modulator 16 onto rear-projection screen 23 may comprise one or more mirrors, lenses or other optical elements. Such an optical system has the function of imaging light modulated by the first light modulator onto a second light modulator. Optical system 17 may be termed an imaging means.

In the illustrated embodiment, rear-projection screen 23 comprises a second light modulator 20 and a collimator 18. A main function of collimator 18 is to cause light which passes through rear-projection screen 23 to be directed preferentially toward a viewing area. Collimator 18 may comprise a Fresnel lens, a holographic lens, or, in the alternative, another arrangement of one or more lenses and/or other optical elements which operate to guide light in the direction of a viewing area.

In the illustrated embodiment, collimator 18 causes light to travel through the elements of second light modulator 20 in a direction which is generally normal to screen 23. As light incident from collimator 18 travels through second light modulator 20 it is further modulated. The light then passes to a diffuser 22 which scatters the outgoing light through a range of directions so that a viewer located on an opposite side of diffuser 22 from first light modulator 16 can see light originating from the whole area of screen 23. In general, diffuser 22 may scatter light to a different angular extent in the horizontal and vertical planes. Diffuser 22 should be selected so that light modulated by second light modulator 20 is scattered through a range of angles such that the maximum scatter angle is at least equal to the angle subtended by screen 23 when viewed from a desired viewing location.

Rear-projection screen 23 may differ in area from first light modulator 16. For example, rear-projection screen 23 may be larger in area than first light modulator 16. Where this is the case, optical system 17 expands the beam of light modulated by first light modulator 16 to illuminate a corresponding area on rear-projection screen 23 which is larger than first light modulator 16.

Second light modulator 20 may be of the same type as first light modulator 16 or a different type. Where first and second light modulators 16 and 20 are both of types that polarize light, second light modulator 20 should, as much as is practical, be oriented so that its plane of polarization matches that of the light incident on it from first light modulator 16.

Display 10 may be a color display. This may be achieved in various ways including:
  making one of first light modulator 16 and second light modulator 20 a color light modulator;
  providing a plurality of different first light modulators 16 operating in parallel on different colors; and,
  providing a mechanism for rapidly introducing different color filters into the light path ahead of second light modulator 20.

As an example of the first approach above, second light modulator 20 may comprise an LCD panel having a plurality of pixels each comprising a number of colored sub-pixels. For example, each pixel may comprise three sub-pixels, one associated with a red filter, one associated with a green filter and one associated with a blue filter. The filters may be integral with the LCD panel.

Figure 1A:
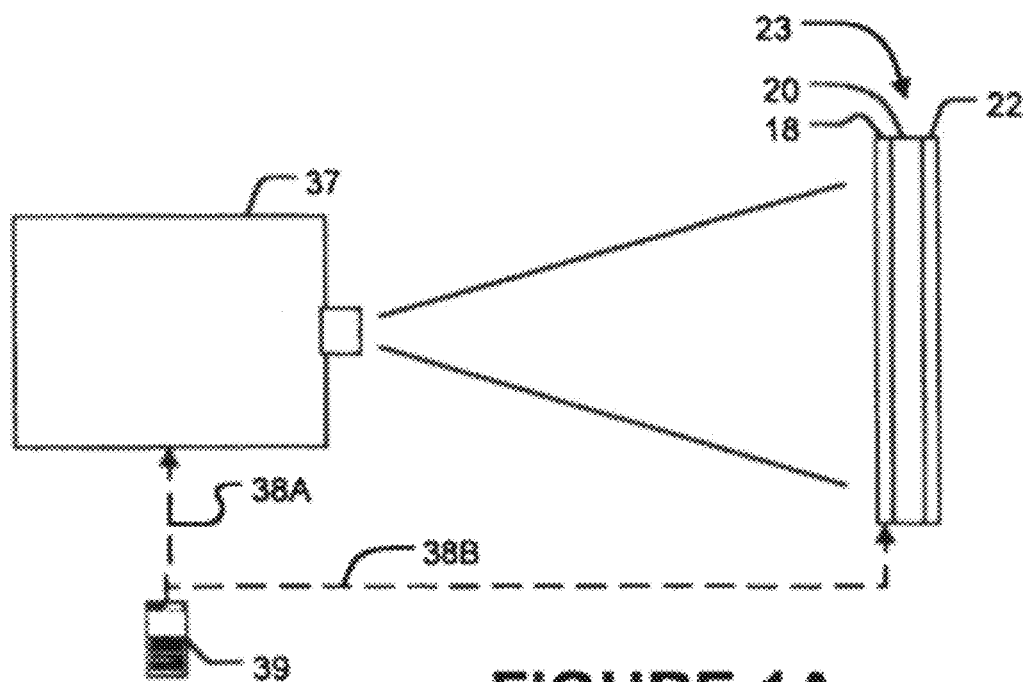
FIG. 1A is a schematic illustration of a specific implementation of the display of FIG. 1.

As shown in FIG. 1A, Light source 12, first light modulator 16 and optical system 17 may all be parts of a digital video projector 37 located to project an image defined by a signal 38A from a controller 39 onto the back side of rear-projection screen 23. The elements of second light modulator 20 are controlled by a signal 38B from controller 39 to provide an image to a viewer which has a high dynamic range.

Controller 39 may comprise any suitable data processor. Controller 39 may comprise one or more microprocessors running suitable control software together with interfaces which permit controller 39 to control the operation of a display according to the invention. The general construction of such controllers and general techniques for programming such controllers to provide desired functions are well known to those skilled in the art and will not be described in detail herein.

Figure 2:
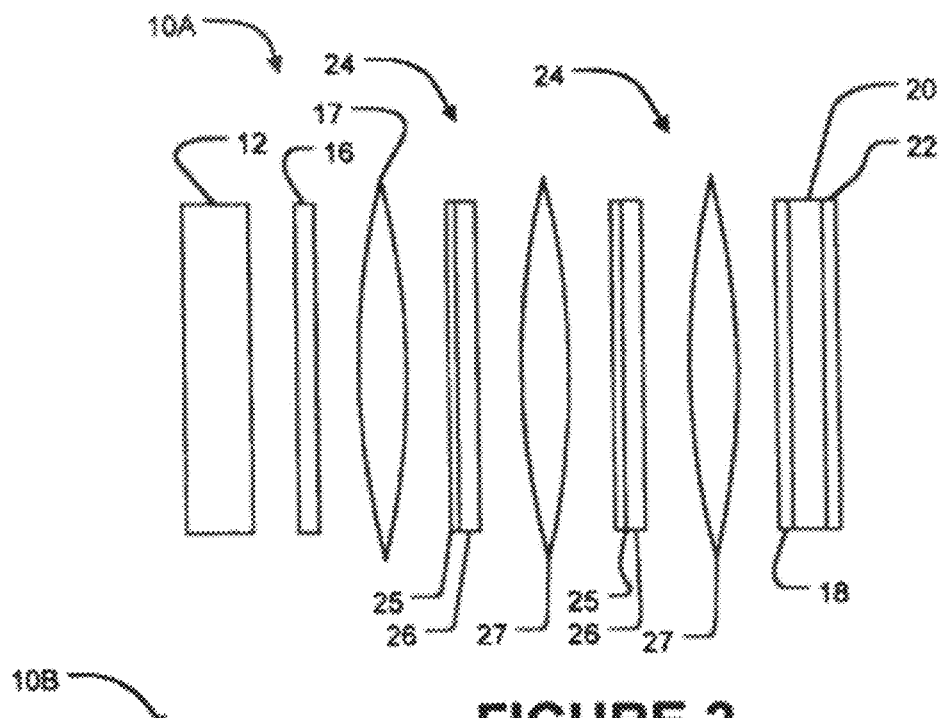
FIG. 2 is a schematic illustration of a display according to an alternative embodiment comprising four spatial light modulators.

As shown in FIG. 2, a display 10A according to the invention may comprise one or more additional light modulation stages 24. Each additional light modulation stage 24 comprises a collimator 25, a light modulator 26 and an optical system 27 which focuses light from light modulator 26 onto either the next additional light modulation stage 24 or on collimator 18. In device 10A of FIG. 2 there are two additional light modulation stages 24. Devices according to this embodiment of the invention may have one or more additional light modulation stages 24.

The luminance of any point on output diffuser 22 can be adjusted by controlling the amount of light passed on by corresponding elements of light modulators 16, 20 and 26. This control may be provided by a suitable control system (not shown in FIG. 2) connected to drive each of light modulators 16, 20 and 26.

Figure 3:
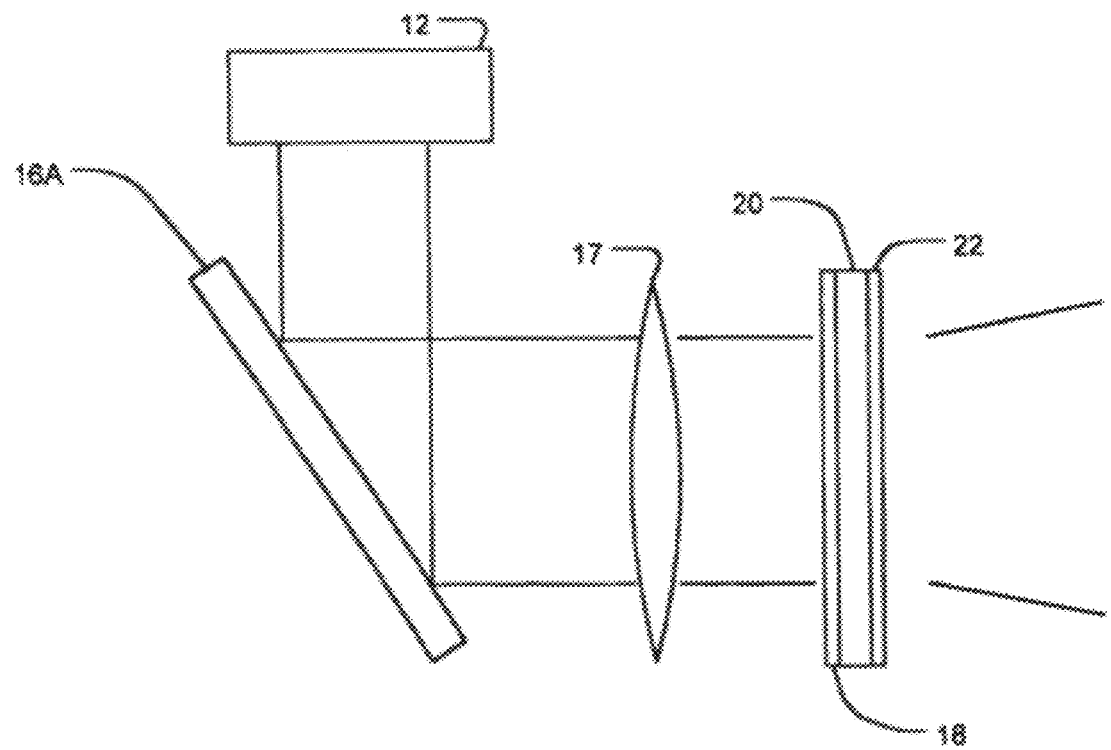
FIG. 3 is a schematic illustration of a rear-projection-type display according to a further embodiment.

As noted above, light modulators 16, 20 and 26 may all be of the same type or may be of two or more different types. FIG. 3 illustrates a display 10B according to an alternative embodiment of the invention which includes a first light modulator 16A which comprises a deformable mirror device. A deformable mirror device is a "binary" device in the sense that each pixel may be either "on" or "off". Different apparent brightness levels may be produced by tuning a pixel on and off rapidly. Such devices are described, for example, in U.S. Pat. Nos. 4,441,791 and, 4,954,789 and are commonly used in digital video projectors. Light source 12 and first light modulator 16 (or 16A) may be the light source and modulator from a commercial digital video projector, for example.

Figure 4:
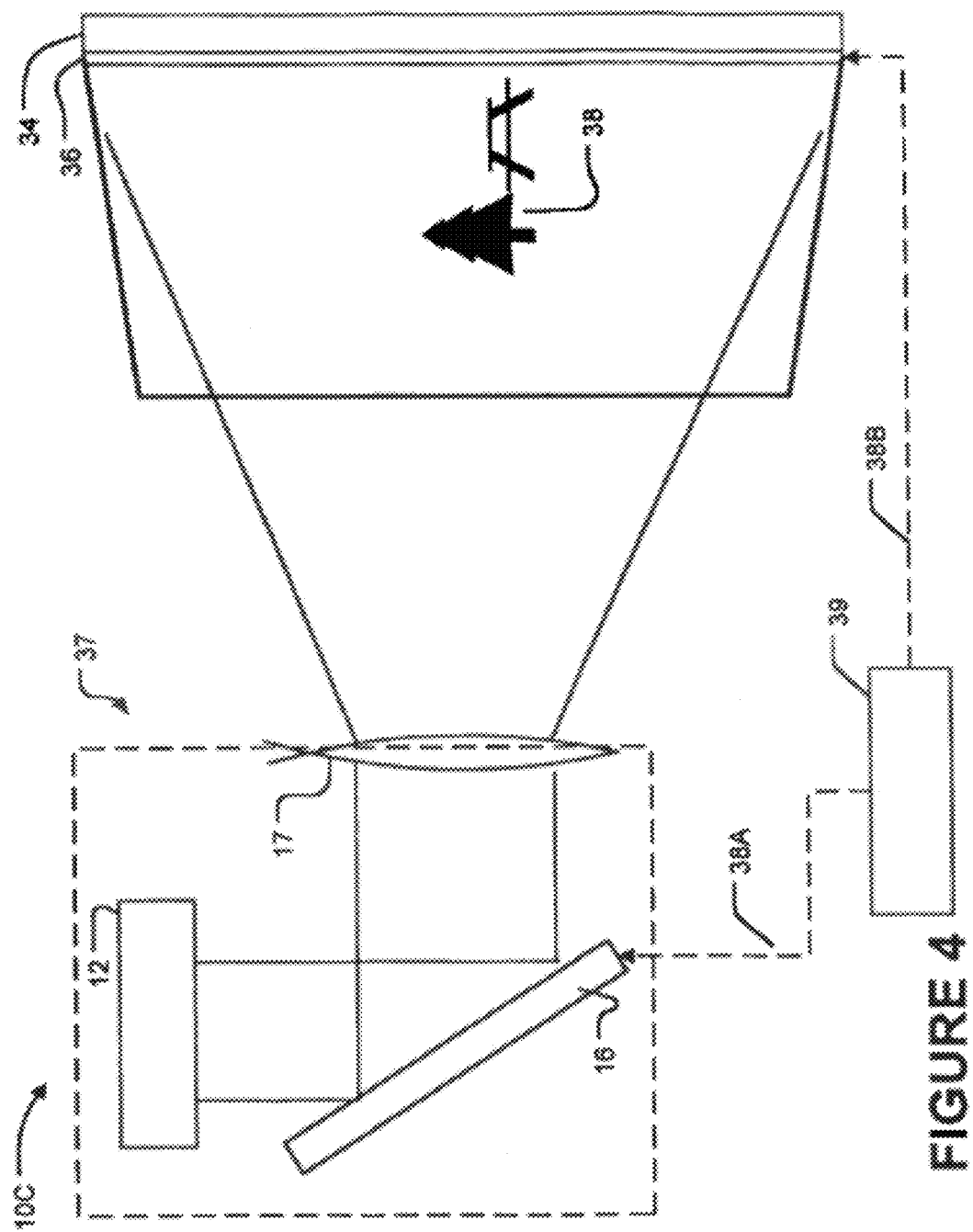
FIG. 4 is a schematic illustration of a front-projection-type display according to a still further embodiment.

FIG. 4 illustrates a front-projection-type display 10C according to the invention. Display 10C comprises a screen 34. A projector 37 projects an image 38 onto screen 34. Projector 37 comprises a suitable light source 12, a first light modulator 16 and an optical system 17 suitable for projecting an image defined by first light modulator 16 onto screen 34. Projector 37 may comprise a commercially available display projector. Screen 34 incorporates a second light modulator 36. Second light modulator 36 comprises a number of addressable elements which can be individually controlled to affect the luminance of a corresponding area of screen 34.

Light modulator 36 may have any of various constructions. For example, light modulator 36 may comprise an array of LCD elements each having a controllable transmissivity located in front of a reflective backing. Light projected by projector 37 passes through each LCD element and is reflected back through the LCD element by the reflective backing. The luminance at any point on screen 34 is determined by the intensity of light received at that point by projector 37 and the degree to which light modulator 36 (e.g. the LCD element at that point) absorbs light being transmitted through it.

Light modulator 36 could also comprise an array of elements having variable retro-reflection properties. The elements may be prismatic. Such elements are described, for example, in Whitehead, U.S. Pat. No. 5,959,777 entitled Passive High Efficiency Variable Reflectivity Image Display Device and, Whitehead et al., U.S. Pat. No. 6,215,920 entitled Electrophoretic, High Index and Phase Transition Control of Total Internal Reflection in High Efficiency Variable Reflectivity Image Displays.

Light modulator 36 could also comprise an array of electrophoretic display elements as described, for example, in Albert et al., U.S. Pat. No. 6,172,798 entitled Shutter Mode Microencapsulated Electrophoretic Display; Comiskey et al., U.S. Pat. No. 6,120,839 entitled Electro-osmotic Displays and Materials for Making the Same; Jacobson, U.S. Pat. No. 6,120,588 entitled: Electronically Addressable Microencapsulated Ink and Display; Jacobson et al., U.S. Pat. No. 6,323,989 entitled Electrophoretic Displays Using Nanoparticles; Albert, U.S. Pat. No. 6,300,932 entitled Electrophoretic Displays with Luminescent Particles and Materials for Making the Same or, Comiskey et al., U.S. Pat. No. 6,327,072 entitled Microcell Electrophoretic Displays.

As shown in FIGS. 6A and 6B, screen 34 preferably comprises a lens element 40 which functions to direct light preferentially toward the eyes of viewers. In the illustrated embodiment, lens element 40 comprises a Fresnel lens having a focal point substantially coincident with the apex of the cone of light originating from projector 37. Lens element 40 could comprise another kind of lens such as a holographic lens. Lens element 40 incorporates scattering centers 45 which provide a desired degree of diffusion in the light reflected from screen 34. In the illustrated embodiment, second light modulator 36 comprises a reflective LCD panel having a large number of pixels 42 backed by a reflective layer 43 and mounted on a backing 47.

Where light modulator 36 comprises an array of elements having variable retro-reflection properties, the elements themselves could be designed to direct retro-reflected light preferentially in a direction of a viewing area in front of screen 34. Reflective layer 43 may be patterned to scatter light to either augment the effect of scattering centers 45 or replace scattering centers 45.

As shown in FIG. 4, a controller 39 provides data defining image 38 to each of first light modulator 16 and second light modulator 36. Controller 39 could comprise, for example, a computer equipped with a suitable display adapter. The luminance of any point on screen 34 is determined by the combined effect of the pixels in first light modulator 16 and second light modulator 36 which correspond to that point. There is minimum luminance at points for which corresponding pixels of the first and second light modulators are set to their "darkest" states. There is maximum luminance at points for which corresponding pixels of the first and second light modulators are set to their "brightest" states. Other points have intermediate luminance values. The maximum luminance value might be, for example, on the order of $10^5$ cd/m$^2$. The minimum luminance value might be, for example on the order of $10^{-2}$ cd/m$^2$.

The cost of a light modulator and its associated control circuitry tends to increase with the number of addressable elements in the light modulator. In some embodiments of the invention one of the light modulators has a spatial resolution significantly higher than that of one or more other ones of the light modulators. When one or more of the light modulators are lower-resolution devices the cost of a display according to such embodiments of the invention may be reduced. In color displays comprising two or more light modulators, one of which is a color light modulator (a combination of a plurality of monochrome light modulators may constitute a color light modulator as shown, for example, in FIG. 6) and one of which is a higher-resolution light modulator, the higher-resolution light modulator should also be the color light modulator. In some embodiments the higher-resolution light modulator is imaged onto the lower-resolution light modulator. In other embodiments the lower-resolution light modulator is imaged onto the higher-resolution light modulator.

Figure 5:
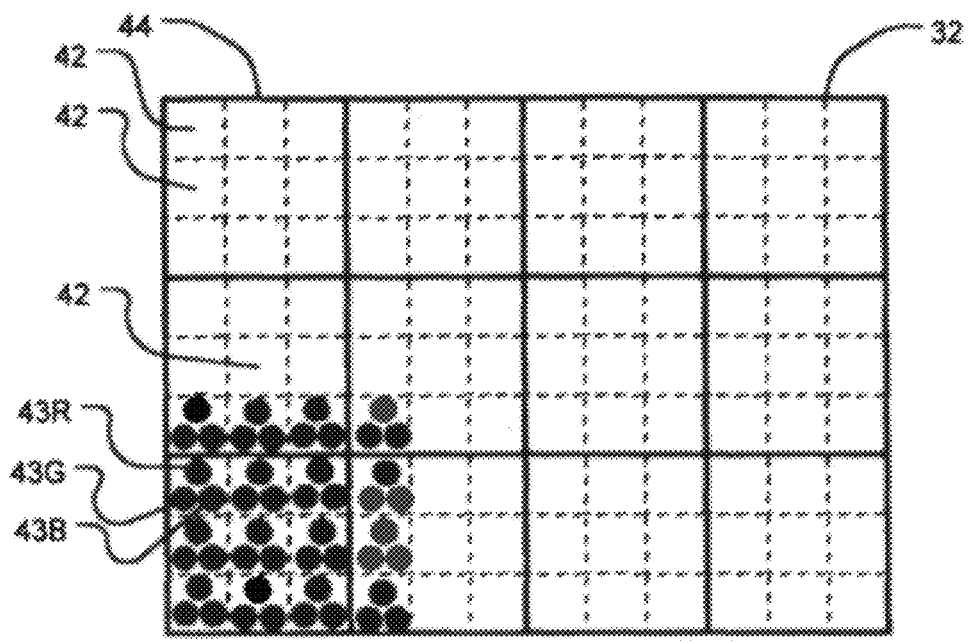
FIG. 5 is a drawing illustrating a possible relationship between pixels in a higher-resolution spatial light modulator and pixels in a lower-resolution spatial light modulator in a display.

FIG. 5 illustrates one possible configuration of pixels in a display 10 as shown in FIG. 1. Nine pixels 42 of a second light modulator 20 correspond to each pixel 44 of a first light modulator 16. The number of pixels 42 of second light modulator 20 which correspond to each pixel 44 of first light modulator 16 may be varied as a matter of design choice. Pixels 44 of the higher-resolution one of first and second light modulators 16 and 20 (or 36) should be small enough to provide a desired overall resolution. In general there is a trade off between increasing resolution and increasing cost. In a typical display the higher-resolution light modulator will provide an array of pixels having at least a few hundred pixels in each direction and more typically over 1000 pixels in each direction.

Figure 5A:
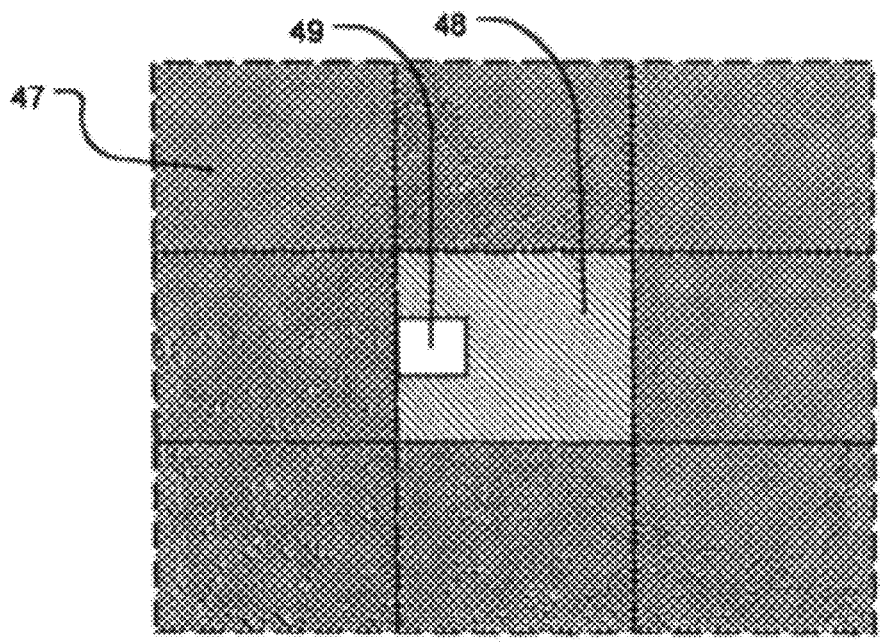
FIG. 5A illustrates an effect of providing one light modulator which has lower resolution than another light modulator.

The size of pixels 42 of the lower-resolution one of the first and second light modulators determines the scale over which one can reliably go from maximum intensity to minimum intensity. Consider, for example, FIG. 5A which depicts a situation where one wishes to display an image of a small maximum-luminance spot on a large minimum-luminance background. To obtain maximum luminance in a spot 47, those pixels of each of the first and second light modulators which correspond to spot 47 should be set to their maximum-luminance values. Where the pixels of one light modulator are lower in resolution than pixels of the other light modulator then some pixels of the lower-resolution light modulator will straddle the boundary of spot 47. This is the case, for example, in FIG. 5A.

Outside of spot 47 there are two regions. In region 48 it is not possible to set the luminance to its minimum value because in that region the lower-resolution light modulator is set to its highest luminance value. In region 49 both of the light modulators can be set to their lowest-luminance values. If, for example, each of the first and second light modulators has a luminance range of 1 to 100 units, then region 47 might have a luminance of 100×100=10,000 units, region 48 would have a luminance of 100×1=100 units and region 49 would have a luminance of 1×1=1 units.

As a result of having one of the light modulators lower in resolution than the other, each pixel of the lower-resolution light modulator corresponds to more than one pixel in the higher-resolution light modulator. It is not possible for points corresponding to any one pixel of the lower-resolution light modulator and different pixels of the higher-resolution light modulator to have luminance values at extremes of the device's dynamic range. The maximum difference in luminance between such points is determined by the dynamic range provided by the higher-resolution light modulator.

It is generally not a problem that a display is not capable of causing closely-spaced points to differ in luminance from one another by the full dynamic range of the display. The human eye has enough intrinsic scatter that it is incapable of appreciating large changes in luminance which occur over very short distances in any event.

In a display according to the invention which includes both a lower-resolution spatial light modulator and a higher-resolution spatial light modulator, controller 39 may determine a value for each pixel of the lower-resolution spatial light modulator and adjust the signals which control the higher-resolution spatial light modulator to reduce artifacts which result from the fact that each pixel of the lower-resolution spatial light modulator is common to a plurality of pixels of the higher-resolution spatial light modulator. This may be done in any of a wide number of ways.

To take but one example, consider the case where each pixel of the lower-resolution spatial light modulator corresponds to a plurality of pixels of the higher-resolution spatial light modulator. Image data specifying a desired image is supplied to the controller. The image data indicates a desired luminance for each of an image area corresponding to each of the pixels of the higher-resolution spatial light modulator. The controller may set the pixels of the lower-resolution light modulator to provide an approximation of the desired image. This could be accomplished, for example, by determining an average or weighted average of the desired luminance values for the image areas corresponding to each pixel of the lower-resolution display.

The controller may then set the pixels of the higher-resolution display to cause the resulting image to approach the desired image. This could be done, for example, by dividing the desired luminance values by the intensity of light incident from the lower-resolution light modulator on the corresponding pixels of the higher-resolution light modulator. The intensity of light incident from the lower-resolution light modulator on a pixel of the higher-resolution light modulator can be computed from the known way that light from each pixel of the lower resolution spatial light modulator is distributed on the higher resolution spatial light modulator. The contributions from one or more of the pixels of the lower resolution spatial light modulator can be summed to determine the intensity with which any pixel of the higher resolution spatial light modulator will be illuminated for the way in which the pixels of the lower resolution spatial light modulator are set.

If the low-resolution pixels are too large then a viewer may be able to discern a halo around bright elements in an image. The low resolution pixels are preferably small enough that the appearance of bright patches on dark backgrounds or of dark spots on bright backgrounds is not unacceptably degraded. It is currently considered practical to provide in the range of about 8 to about 144, more preferably about 9 to 36, pixels on the higher-resolution light modulator for each pixel of the lower-resolution light modulator.

The sizes of steps in which each of pixels 42 and 44 can adjust the luminance of point(s) on the image are not necessarily equal. The pixels of the lower-resolution light modulator may adjust light intensity in coarser steps than the pixels of the higher-resolution light modulator. For example, the lower-resolution light modulator may permit adjustment of light intensity for each pixel over an intensity range of 1 to 512 units in 8 steps while the higher-resolution light modulator may permit adjustment of the light intensity for each pixel over a similar range in 512 steps. While pixels 42 and 44 are both illustrated as being square in FIG. 5, this is not necessary. Pixels 42 and/or 44 could be other shapes, such as rectangular, triangular, hexagonal, round, or oval.

Figure 7:
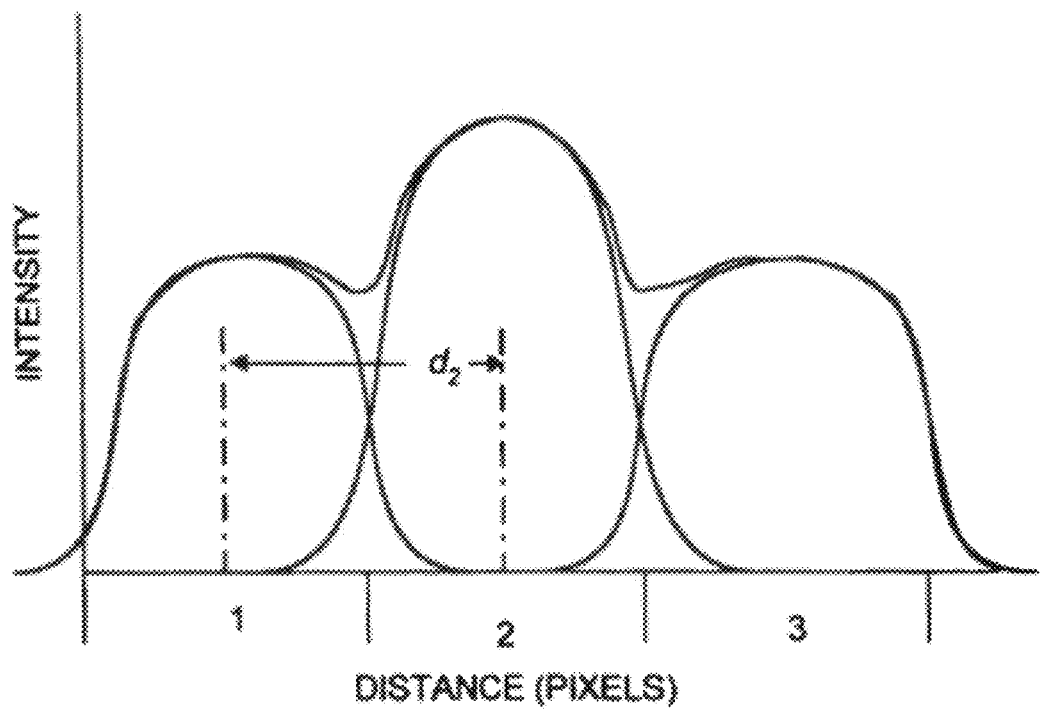
FIG. 7 is a graph illustrating how light imaged onto a higher-resolution light modulator from pixels of a lower-resolution light modulator can overlap to yield a smooth variation in light intensity with position.
Figure 7A:
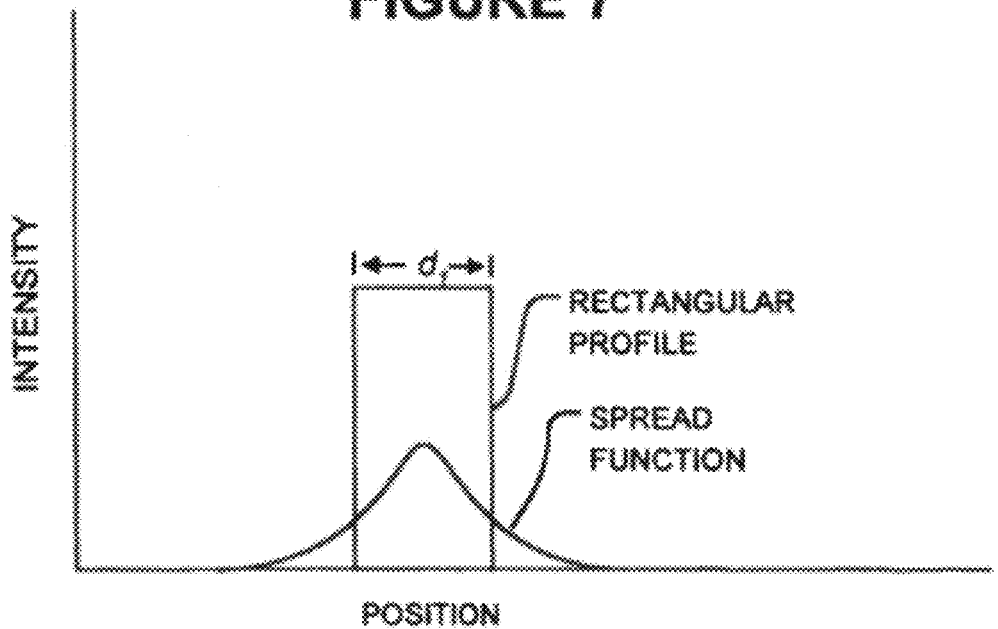
FIG. 7A is a graph illustrating how the variation in light intensity with position for the image of a pixel of a light modulator can be represented as the convolution of a square profile and a spread function.

The pixels of the lower-resolution light modulator preferably emit light which is somewhat diffuse so that the light intensity varies reasonably smoothly as one traverses pixels of the lower-resolution light modulator. This is the case where the light from each of the pixels of the lower-resolution light modulator spreads into adjacent pixels, as shown in FIG. 7. As shown in FIG. 7A, the intensity profile of a pixel in the lower-resolution light modulator can often be approximated by gaussian spread-function convolved with a rectangular profile having a width $d_1$ equal to the active width of the pixel. The spread function preferably has a full width at half maximum in the range of $0.3 \times d_2$ to $3 \times d_2$, where $d_2$ is the center-to-center inter-pixel spacing, to yield the desired smoothly varying light intensity. Typically $d_1$ is nearly equal to $d_2$.

In the embodiment of FIG. 5, each pixel 42 comprises three sub pixels 43R, 43G and 43B (for clarity FIG. 5 omits sub pixels for some pixels 42). Sub-pixels 43R, 43G and 43B are independently addressable. They are respectively associated with red, green and blue color filters which are integrated into second light modulator 20. Various constructions of LCD panels which include a number of colored sub-pixels and are suitable for use in this invention are known in the art.

For front projection-type displays (for example the display 10C of FIG. 4), it is typically most practical for first light modulator 16 to comprise a high-resolution light modulator which provides color information and for light modulator 36 to comprise a monochrome light modulator. Light modulator 36 preferably has reasonably small addressable elements so that the boundaries of its elements do not form a visually distracting pattern. For example, light modulator 36 may have the same number of addressable elements as projector 37 (although each such element will typically have significantly larger dimensions than the corresponding element in light modulator 16 of projector 37).

Projector 37 may have any suitable construction. All that is required is that projector 37 be able to project light which has been spatially modulated to provide an image onto screen 34. FIG. 6 illustrates a display system 10D according to a further alternative embodiment of the invention. System 10D comprises a screen 34 which has an integrated light modulator 36 as described above with reference to FIG. 4. System 10D comprises a projector 37A which has separate light modulators 16R, 16G and 16R for each of three colors. Light modulated by each of light modulators 16R, 16G and 16R is filtered by a corresponding one of three colored filters 47R, 47G and 47B. The modulated light is projected onto screen 34 by optical systems 17. A single light source 12 may supply light to all three light modulators 16R, 16G, and 16B, or separate light sources (not shown) may be provided.

In the embodiments described above, light from a light source is spatially modulated by a first light modulator and then imaged onto a second light modulator. The inventors have realized that the functions of the light source and first light modulator can be combined by providing a light source comprising an array of light-emitting elements which each have a controllable brightness. The light-emitting elements may be solid state devices. For example, the light-emitting elements may comprise light-emitting diodes (LEDs). Each of the LEDs may be driven by a driver circuit which allows the current flowing through the LED, and consequently the brightness of the light emitted by the LED, to be controlled. The controller may also, or in the alternative, control a duty cycle of the corresponding LED. As discussed below, the driving circuit may monitor current being delivered to each LED or each group of LEDs and may generate an error signal if the magnitude of the current being delivered to each LED or each group of LEDs has an unexpected value. Such error signals may be used by a controller to compensate for failed LEDs.

In a preferred embodiment of the invention, the LEDs are of a type which emit white light. For example, the LEDs may comprise an array of tri-color LEDs. Tri-color LEDs which each include red, green and blue LEDs all encapsulated within a single housing are commercially available. One or more white LEDs may be used to illuminate each group of pixels of the second light modulator.

Figure 8:
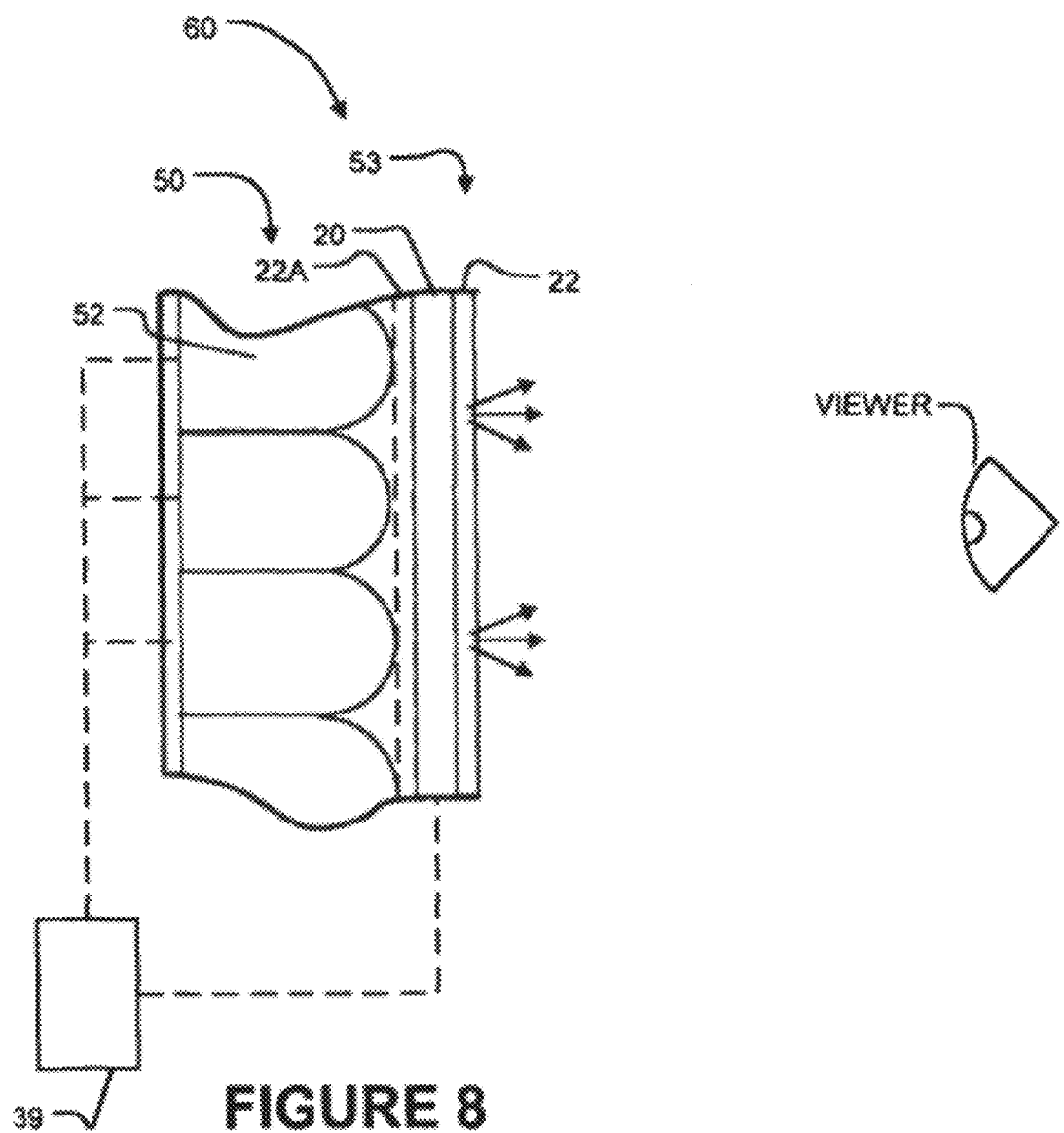
FIG. 8 is a schematic cross-section of a display according to an alternative embodiment and FIG. 8A is a schematic front view thereof.
Figure 8A:
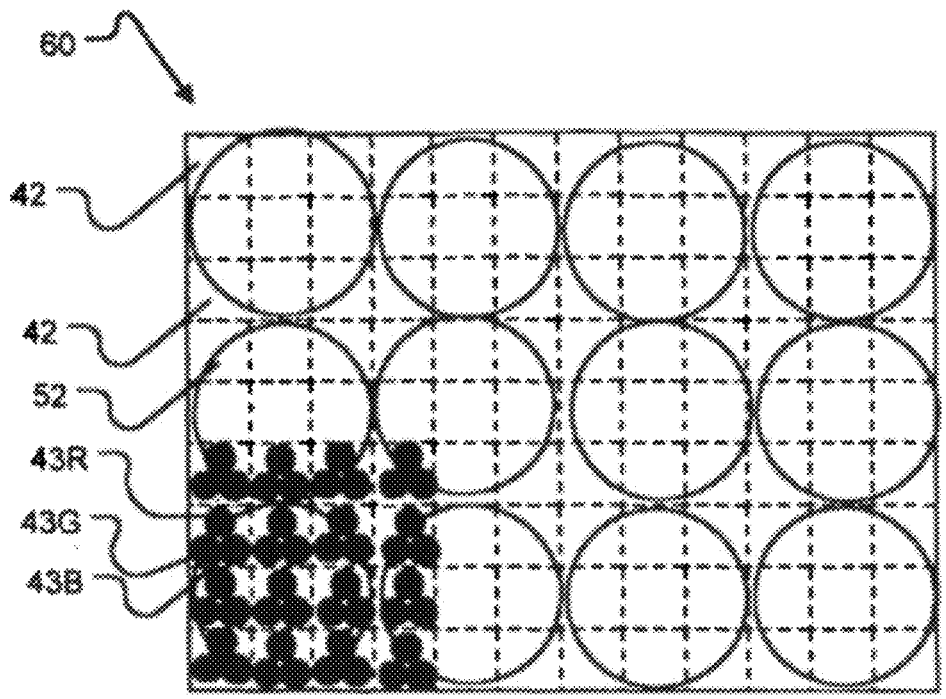

FIG. 8 shows a section through a display 60 according to an embodiment of the invention in which a rear-projection screen 53 comprising a diffusing layer 22 is illuminated by an array 50 of LEDs 52. The brightness of each LED 52 is controlled by a controller 39. Screen 53 includes a light modulator 20. The rear face of light modulator 20 is illuminated by LED array 50. FIG. 8A is a schematic front view of a portion of display 60 for a case where controllable elements (pixels) 42 of light modulator 20 correspond to each LED 52. Each of the controllable elements 42 may comprise a plurality of colored sub-pixels.

Figure 9A:
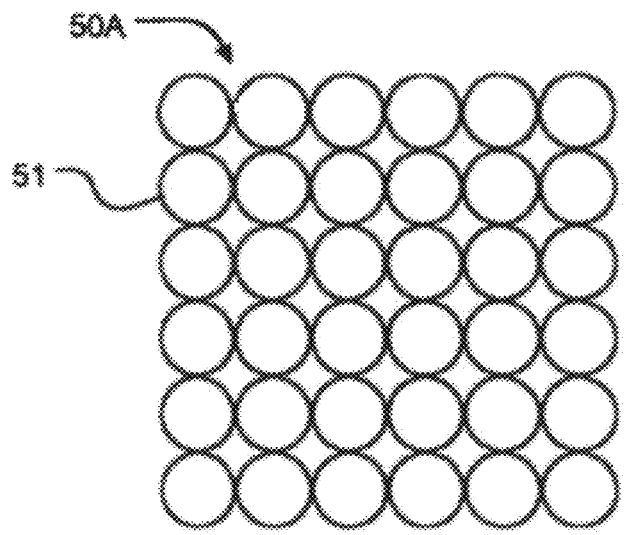
FIGS. 9A and 9B illustrate two possible configurations for an array of light emitting elements which could be used in the embodiment of FIG. 8.
Figure 9B:
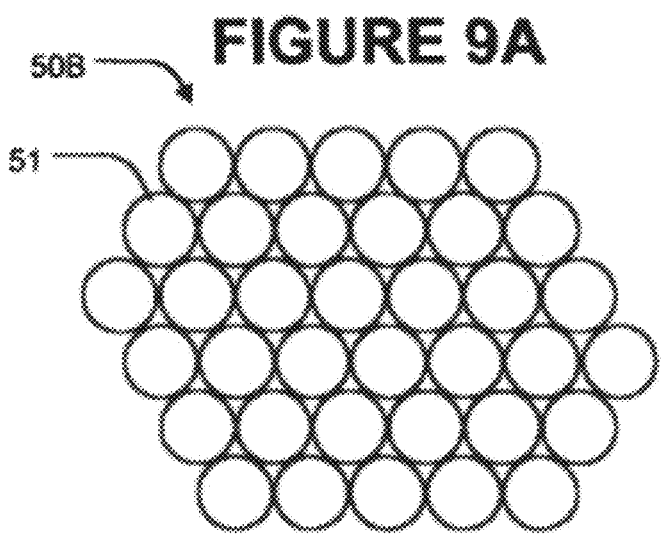

LEDs 52 may be arranged in any suitable manner in array 50. Two likely arrangements of LEDs 52 are shown in FIGS. 9A and 9B. FIG. 9A illustrates a rectangular array 50A of light sources 51. FIG. 9B illustrates a hexagonal array 50B of light sources 51. Light sources 51 may comprise LEDs 52. Where light sources 51 comprise discrete devices, a regular spacing between light sources 51 may be maintained by packing light sources 51 together as illustrated in FIG. 9A or 9B, for example.

A diffuser 22A in conjunction with the light-emitting characteristics of LEDs 52 causes the variation in intensity of light from LEDs 52 over the rear face of light modulator 20 to be smooth.

A similar effect can be obtained without a diffuser 22A by spacing light modulator 20 away from LEDs 52. Where light modulator 20 is spaced away from LEDs 52, light from each LED 52 can contribute to illuminating edges of the areas of spatial light modulator 20 corresponding to neighboring LEDs 52.

Figure 8B:
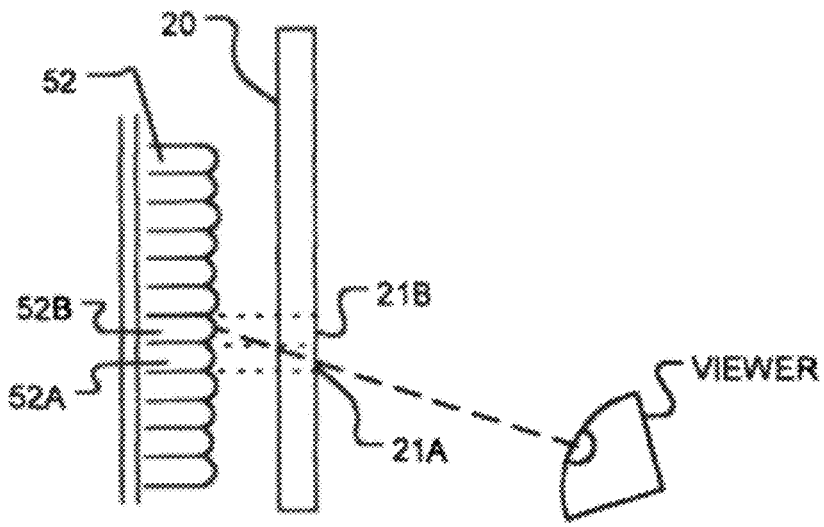
FIG. 8B is a schematic cross section of a display in which a spatial light modulator is spaced in front of an array of light sources.

In cases where it is necessary that the display be viewable through a large range of angles, such spacing can cause a parallax problem. Where a viewer is not viewing a display head-on, as shown in FIG. 8B, the viewer may see a pixel of spatial light modulator 20 illuminated by an LED 52 which does not correspond to the pixel. For example, in FIG. 8B, area 21A corresponds to LED 52A and area 21B corresponds to LED 52B. However, due to parallax, the viewer sees pixels in area 21A as being illuminated by LED 52B.

Figure 8D:
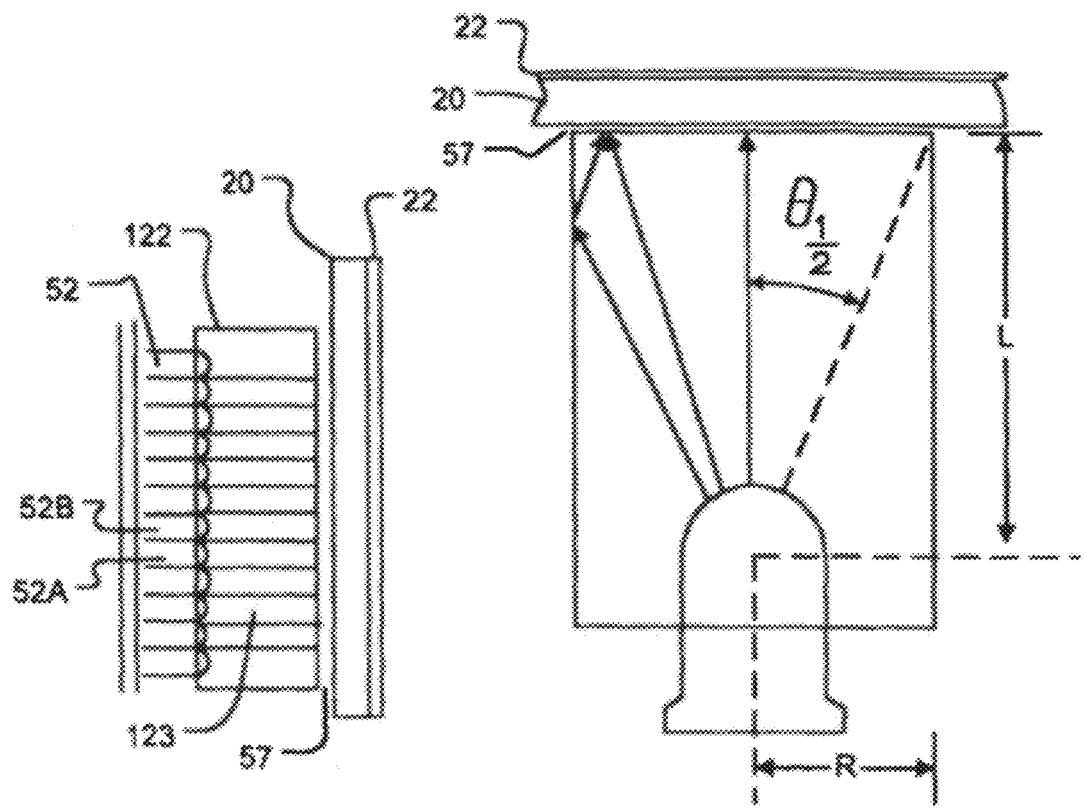
FIG. 8D is an isometric view of a hexagonal grid.
Figure 8D:
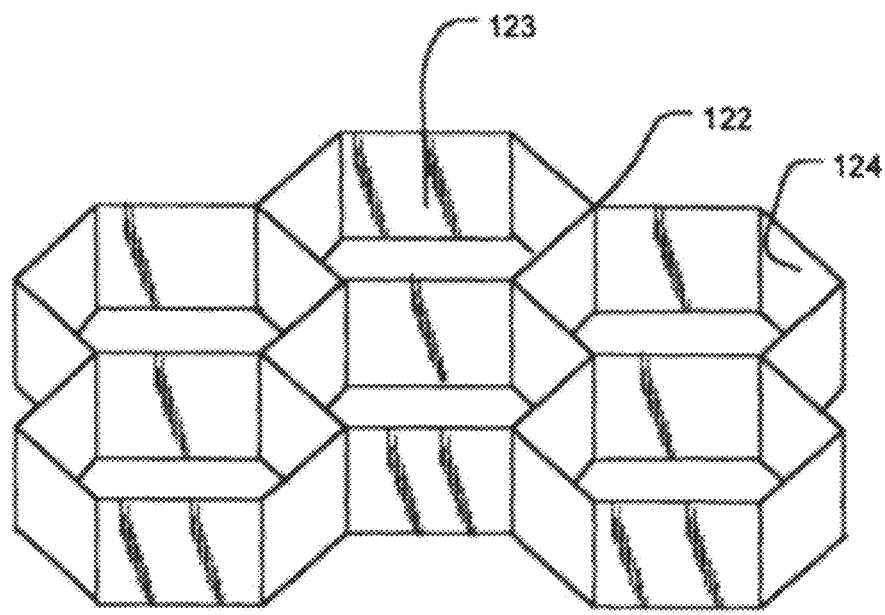

FIG. 8C shows an alternative construction which avoids the parallax problem illustrated by FIG. 8B. In FIG. 8C, a grid 122 of reflective-walled channels 123 is disposed between array 50 and spatial light modulator 20. In a preferred embodiment, channels 123 are hexagonal in cross section and grid 122 comprises a honeycomb structure as shown in FIG. 8D. Channels 123 could also have other cross sectional shapes such as square, triangular, rectangular or the like. The walls which define channels 123 are preferably thin. Grid 122 could comprise, for example, a section of aluminum honeycomb material.

Figure 8F:
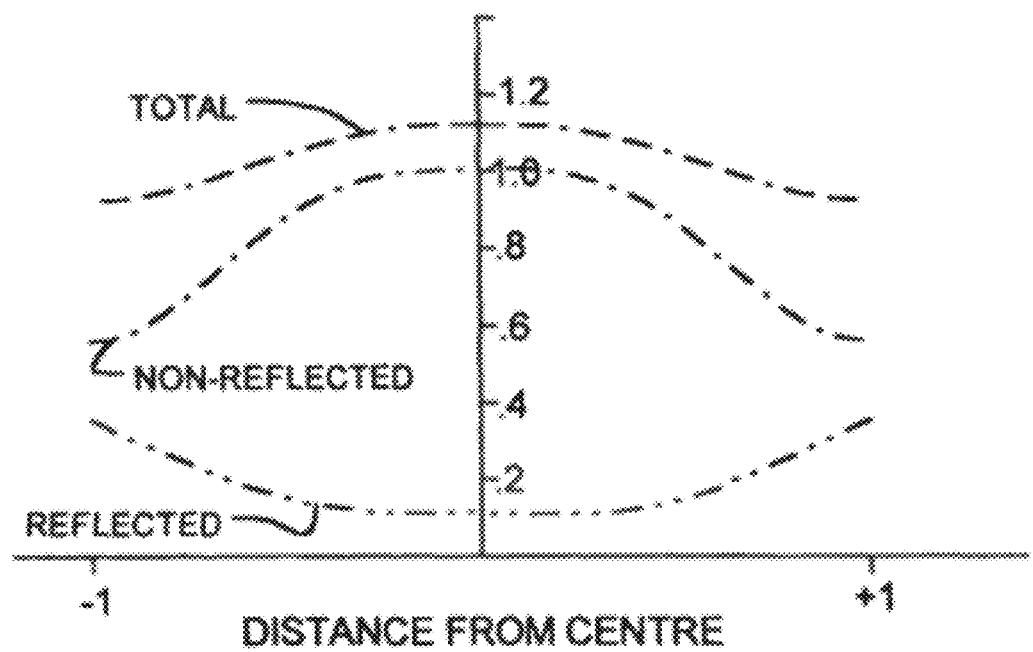
FIG. 8F is a graph showing how reflected and non-reflected light components can sum to provide improved uniformity of illumination.
Figure 8G:
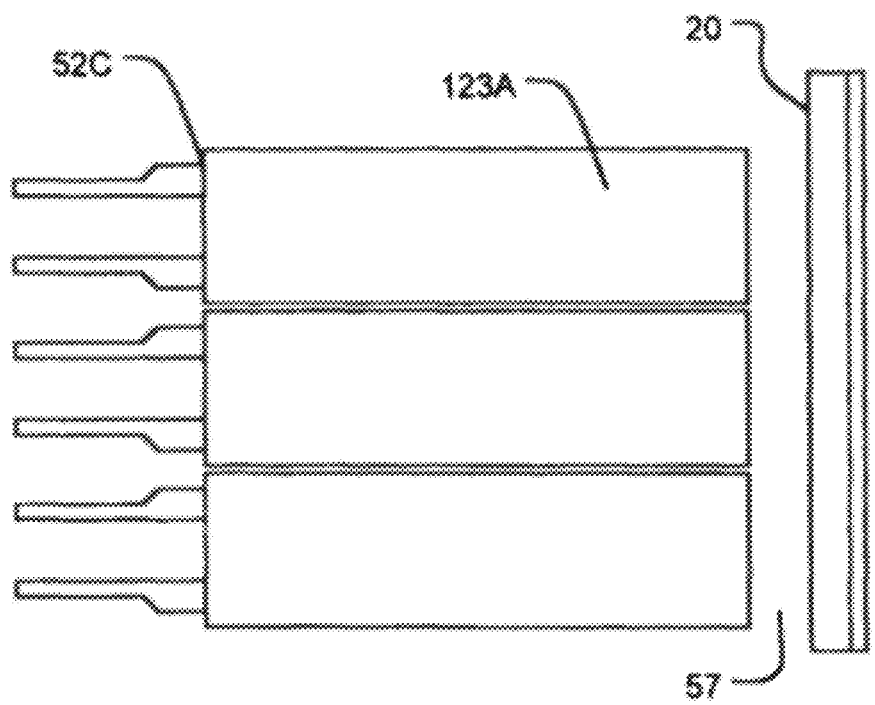
FIG. 8G is a schematic representation of a display wherein internally reflecting members which form a grid are formed integrally with the material encapsulating LEDs.

Channels 123 may be, but are not necessarily hollow. Channels 123 may be provided by columns of light-transmitting material having walls at which light is internally reflected, preferably totally internally reflected. The columns may be separated by thin air gaps or clad in one or more materials which provide an interface at which light is internally reflected. The columns may be integral with the material in which LEDs 52 are encapsulated. FIG. 8G shows an embodiment of the invention in which columns 123A having internally reflecting walls are integrally formed with LEDs 52C. Columns 123A may have various cross sectional shapes such as hexagonal, triangular, square or the like.

Light from each LED 52 passes through a channel 123. As shown in FIG. 8E, some light from an LED passes straight through channel 123 and some light is reflected from reflective walls 124 of channel 123. The luminance at a point on spatial light modulator 20 is contributed to by both reflected and non-reflected light. The reflected component tends to be more intense around the edges of channel 123 while the non-reflected component tends to be more intense toward the center of channel 123. The result is that the uniformity with which each LED 52 illuminates the corresponding portion of spatial light modulator 20 is improved by the presence of grid 122. The increase in uniformity is illustrated in FIG. 8F.

Grid 122 is spaced slightly away from spatial light modulator 20 by a gap 57 (see FIGS. 8C and 8E) to avoid perceptible shadows cast by the walls which separate adjacent channels 123 of grid 122.

The geometry of channels 123 may be varied to achieve design goals. The width of each channel 123 largely determines the resolution with which the intensity of light falling on spatial light modulator 20 can be varied. For a given channel width and cross sectional shape, the uniformity of illumination provided by each channel 123 can be increased by making the channel 123 longer. This, however, reduces the efficiency with which light is passed to spatial light modulator 20.

A reasonable trade off between efficiency and uniformity of illumination may be achieved by providing channels 123 which have lengths L such that near the channel edges non-reflected and once-reflected light components are each approximately half of the intensity of the non-reflected component on the axis of LED 52. One way to approximately achieve this is to choose length L such that the angle θ between the axis of LED 52 and the edge of channel 123 is equal to the half angle $\theta_{1/2}$ of the LED 52. The half angle is the angle at which the illumination provided by LED 52 has an intensity equal to one half of the intensity of illumination in a forward direction on the axis of LED 52. This condition is provided by making L satisfy the condition of equation (1), where R is the half-width of channel 123.

$$L = \frac{R}{\tan(\theta_{1/2})} \quad (1)$$

It is generally desirable to provide one channel 123 for each LED or other light source. In some embodiments of the invention each channel 123 has a plurality of LEDs. In one embodiment of the invention each channel 123 has three LEDs of different colors, for example, red, green and blue. In such embodiments it is important that the channel 123 be long enough that light from each of the LEDs be uniformly distributed at spatial light modulator 20 as the human eye is sensitive to variations in color.

As described above, with reference to FIGS. 7 and 7A, light modulator 20 is preferably illuminated in a manner such that the illumination of light modulator 20 by LED array 50 changes smoothly with position on light modulator 20. This can be accomplished by providing LEDs 52 in LED array 50 which emit light in patterns which overlap somewhat on light modulator 20. The light emitted by each LED 52 may be characterized by a spread function such that the variation of the intensity of light from an LED 52 incident on light modulator 20 is the convolution of a rectangular profile and the spread function. The spread function preferably has a full width at half maximum in the range of $0.3 \times d_2$ to $3 \times d_2$, where $d_2$ is the center-to-center spacing on light modulator 20 between the illumination patterns of adjacent LEDs 52 on light modulator 20. A diffuser 22A (shown in dashed lines FIG. 8) may be interposed between array 50 and light modulator 20 to broaden the illumination patterns of LEDs 52 on light modulator 20.

Figure 9C:
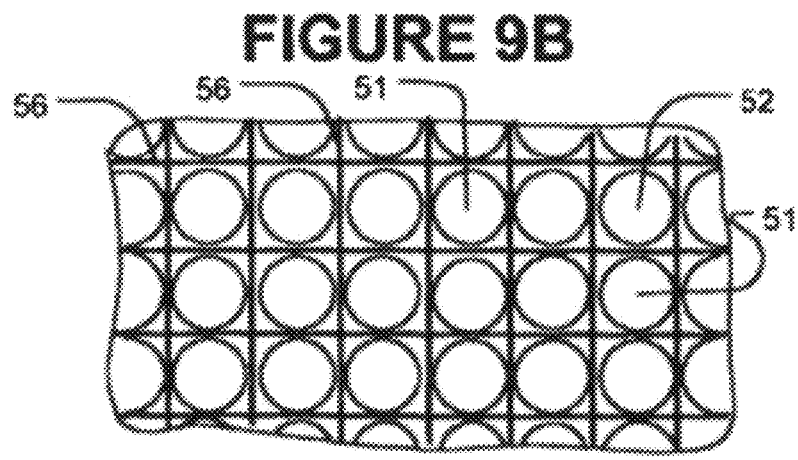
FIG. 9C illustrates the use of light barriers to provide increased sharpness.

For some applications it may be desirable to provide a display on which the level of illumination of closely spaced pixels may be greatly different. This may be achieved, at the cost of some smoothness, by confining light originating from each of the light sources of array 50 so that the illumination patterns of adjacent light sources on light modulator 20 do not overlap significantly. This may be achieved, for example, by providing light barriers 56 which limit the spread of light from each of the light sources of array 50 as shown in FIG. 9C. With light barriers 56, each light source of array 50 illuminates only corresponding pixels of light modulator 20. This may also be achieved by providing light sources 52 which project substantially non-overlapping illumination patterns onto light modulator 20. In either case, the resulting image displayed to a viewer may appear somewhat sharper than in embodiments wherein light from each light source 52 is permitted to spread sufficiently that it provides significant illumination to some pixels corresponding to adjacent light sources. In many cases, limitations of the human eye will make this increased level of sharpness unnoticeable.

Light modulator 20 may be a monochrome light modulator. In the alternative, light modulator 20 may be a high resolution color light modulator. Light modulator 20 may comprise, for example, a LCD array. Display 60 can be quite thin. For example, display 60 may be 10 centimeters or less in thickness.

Figure 10:
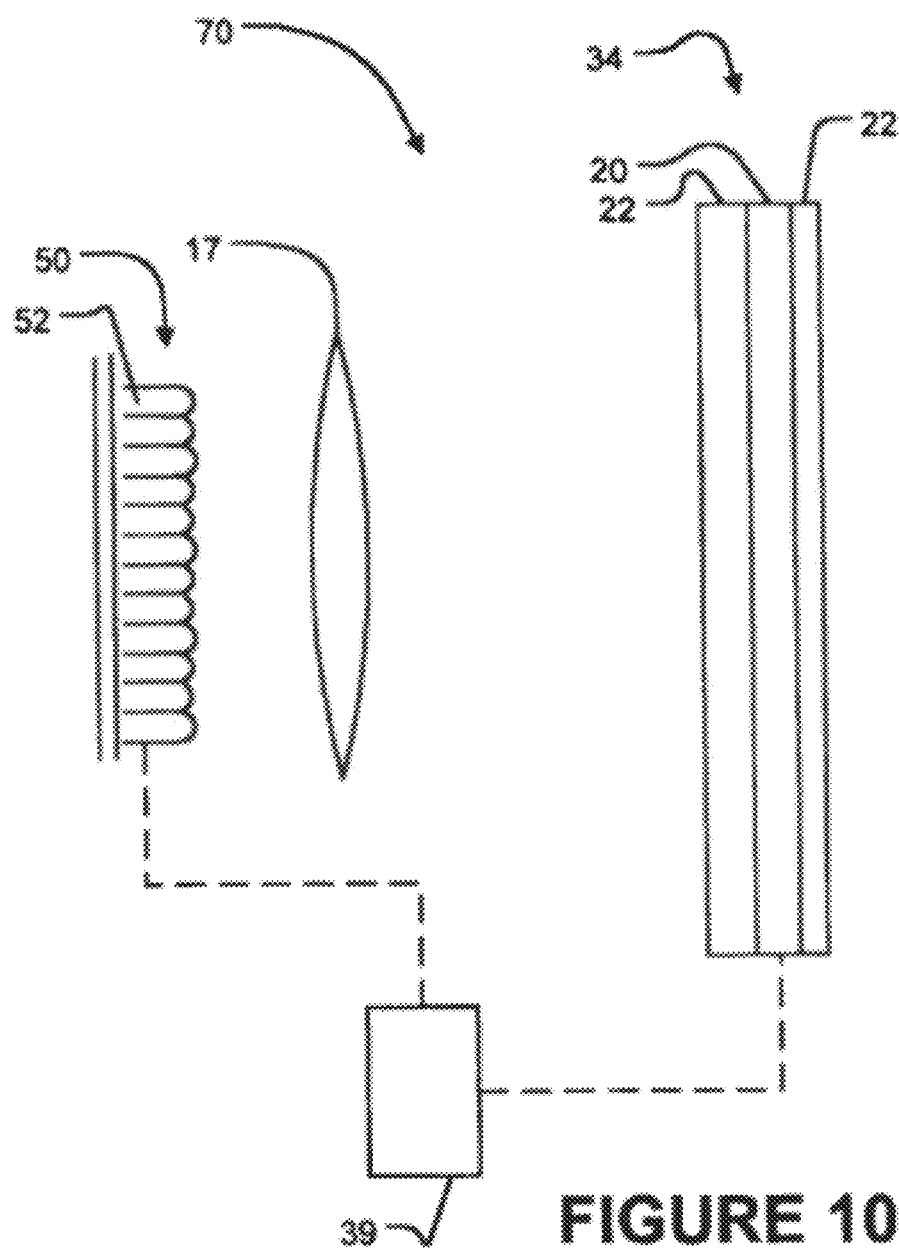
FIG. 10 is a schematic illustration of a projection-type display according to an alternative embodiment of the invention.

FIG. 10 shows a projection-type display 70 which is similar to display 60 of FIG. 8 except that an array 50 of light sources 52 is imaged onto a light modulator 20 by a suitable optical system 17.

A controller 39 may control the elements of array 50 to provide a low-resolution version of an image to be displayed on spatial light modulator 20. Controller 39 may control the elements of spatial light modulator 20 to supply features having a high spatial resolution and to otherwise correct the image provided by array 50 as described above.

One problem with using LEDs 52 as light sources in a high resolution high quality display is that the brightness of light emitted at a specific current level can vary significantly between individual LEDs. This variation is due to manufacturing process variations. Further, the brightness of light that a LED 52 will produce tends to slowly decrease in an unpredictable manner as the LED ages. It is therefore desirable to provide a mechanism for calibrating an LED array 50 to compensate for differences in brightness between different LEDs 52 in array 50.

One calibration mechanism 78 which is illustrated schematically in FIG. 11 provides a light detector 80 which detects light emitted by each of LEDs 52. Light detector 80 may be moved into different positions for capturing light from different LEDs 52. In the alternative, a suitable optical system may be provided to direct light from LEDs 52 to light detector 80. Controller 39 receives a signal 81 from light detector 80. Signal 81 indicates the brightness of light emitted by each LED 52 in array 50 for a given current. If the brightness of light emitted by an LED 52 differs from a desired value then controller 39 determines a correction to be applied to the current applied to each LED 52. Controller 39 subsequently applies the correction. Calibration mechanism 78 may be used for initial calibration of a display. Calibration mechanism 78 may optionally include a calibration controller 39A which performs some calibration tasks, such as determining a correction to be applied to the current applied to each LED 52, and making the resulting calibration information available to controller 39.

It is desirable to provide a calibration mechanism that does not interfere with the normal operation of a display. One way to achieve this is to detect light which is emitted by an LED in a direction other than the forward direction. FIG. 11A shows a typical LED 52. Most light emitted by LED 52 is directed in a forward direction as shown by arrow 55A. A very small fraction of the light emitted by each LED 52 is emitted sideways as indicated by arrows 55B or rearwardly as indicated by arrow 55C. Light emitted in a direction other than the forward direction may be termed "stray light". One or more light detectors 80A may be located to detect stray light from each LED 52.

A calibration mechanism 90 according to one embodiment of the invention is shown in FIG. 11B. In calibration mechanism 90, small optical waveguides 82 carry stray light from LEDs 52 to a light detector 80. Only a small fraction of the light emitted by each LED 52 is captured by waveguides 82. As long as the coupling between a waveguide 82 and the corresponding LED 52 does not change, the proportion of the light emitted by an LED 52 which is captured by waveguide 82 remains constant. One light detector 80A or a few light detectors 80A may be located at convenient locations such as at edges of array 50.

Figure 11C:
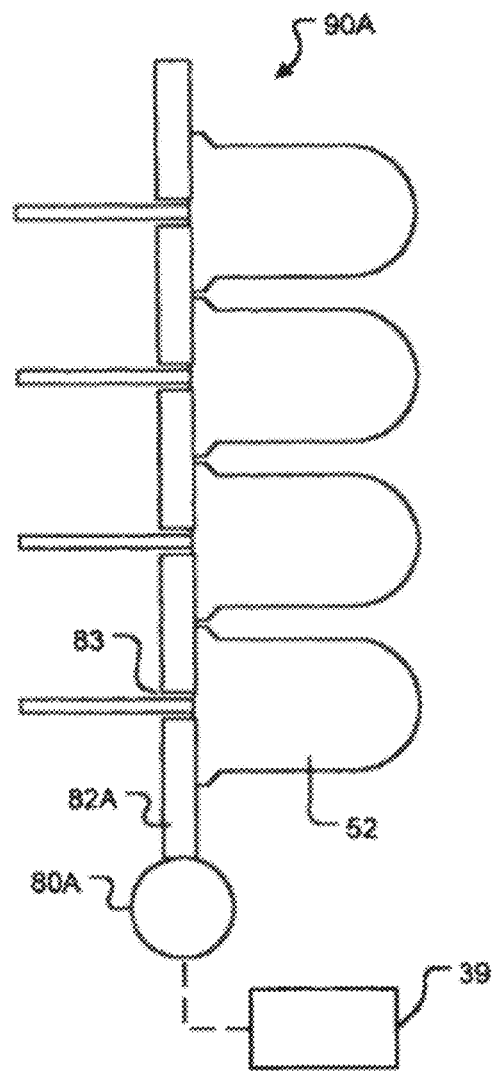
FIG. 11 is a block diagram of a calibration mechanism.
FIG. 11A is a depiction of an LED illustrating paths by which stray light exits the LED; and, FIGS. 11B, 11C, 11D and 11E are schematic diagrams of alternative calibration mechanisms.

FIG. 11C shows a calibration mechanism 90A according to another embodiment of the invention. In mechanism 90A, individual optical waveguides 82 are replaced by a planar optical waveguide 82A. Power leads for LEDs 52 pass through holes 83 in waveguide 82A. One or more light detectors 80A are located at edges of optical waveguide 82A. Light emitted in the rearward direction by any of LEDs 52 is trapped within optical waveguide 82A and detected by light detector(s) 80A.

Figure 11D:
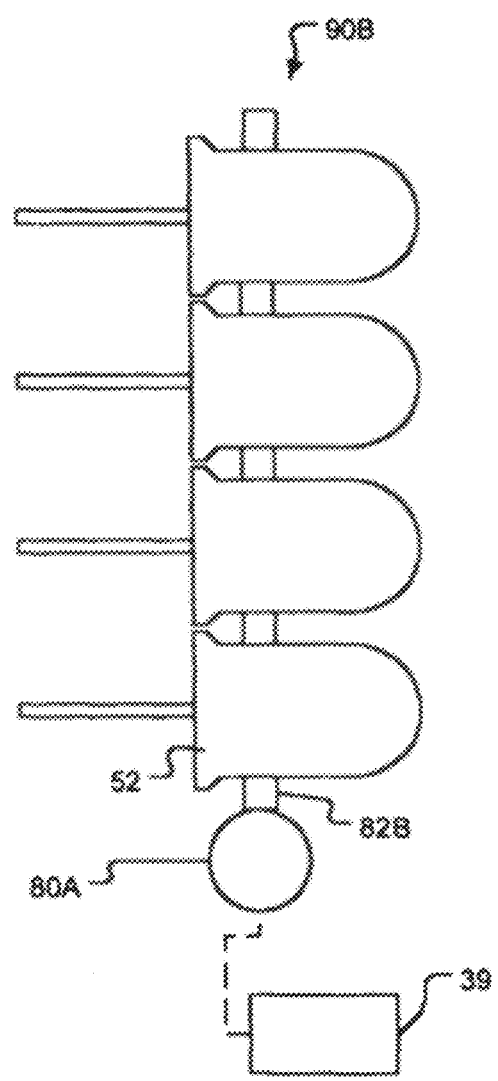

FIG. 11D shows another optical calibration mechanism 90B wherein a planar optical waveguide 82B collects light emitted by LEDs 52 in sideways directions and carries that light to one or more light detectors 80A.

Figure 11E:
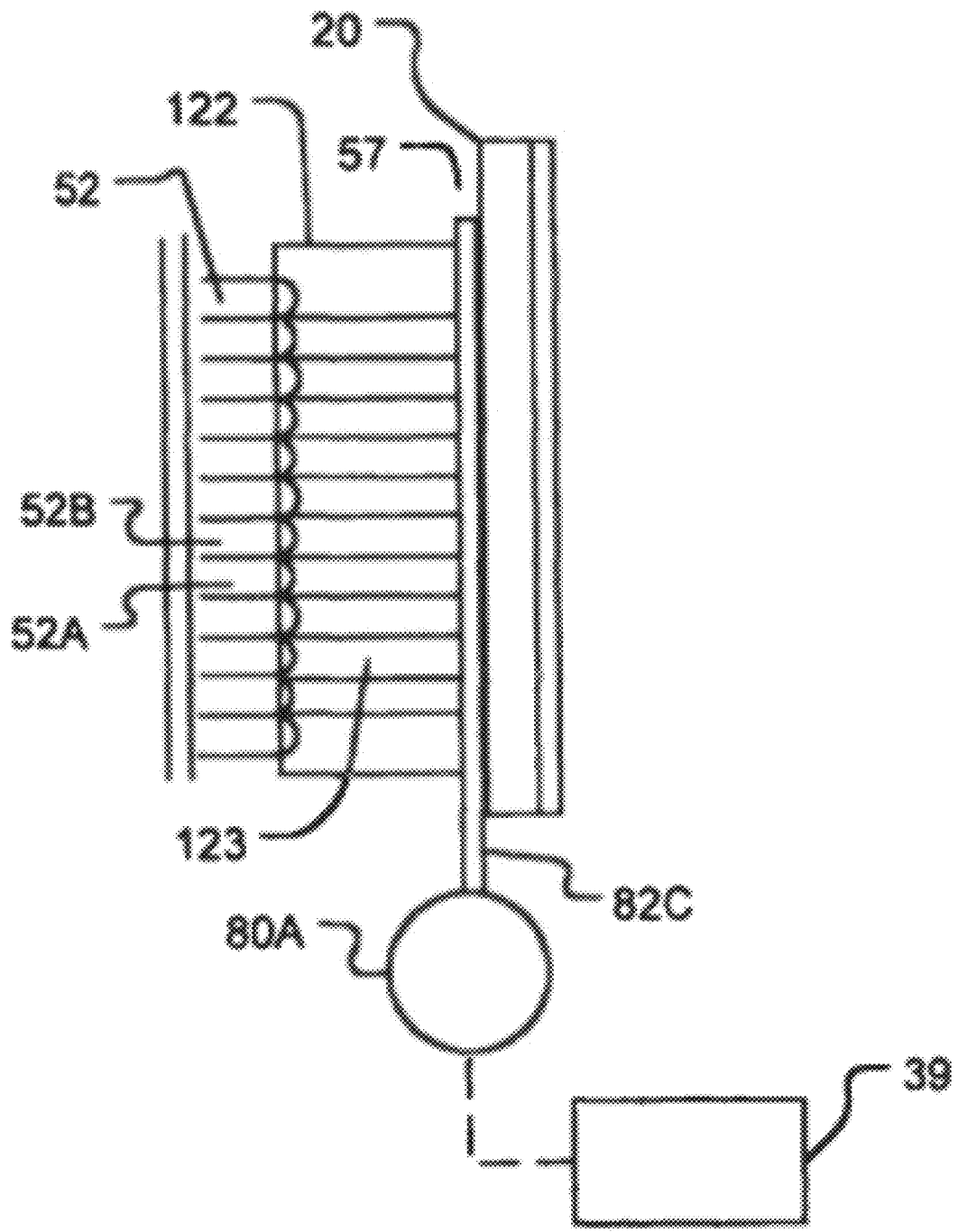

FIG. 11E shows another optical calibration mechanism 90C wherein a planar optical waveguide 82C collects a small fraction of the light emitted by LEDs 52 in the forward direction and carries that light to one or more light detectors 80A. Waveguide 82C is constructed so that some light passing through it in the forward direction is trapped in waveguide 82C and carried to light detector(s) 80A. To achieve this, one surface of waveguide 82C, typically the surface facing LEDs 52 may be roughened slightly to scatter some light generally into the plane of waveguide 82C or some scattering centers may be provided in the material of waveguide 82C. In the illustrated embodiment, waveguide 82C acts as a spacer which maintains a gap 57 between a grid 122 and spatial light modulator 20. Calibration mechanism 80C has the advantage that optical waveguide 82C does not need to be penetrated by holes 83 which can interfere with the propagation of light to light detector(s) 80A.

In operation, an array 50 is first factory calibrated, for example, with a calibration mechanism 78 (FIG. 11). After, or during, factory calibration LEDs 52 are turned on one at a time with current at a calibration level. Light detector(s) 80A are used to measure stray light for each LED 52. Information about the amount of stray light detected for each LED 52 may be stored as a reference value. Over the life of LED array 50, mechanism 90 can be used to monitor the brightness of each LED 52. Depending upon the application, such brightness measurements may be made at times when the display is initialized or periodically while the display is in use. Brightness measurements of one or more LEDs 52 may be made in intervals between the display of successive image frames.

If mechanism 90 detects that the brightness of an LED 52 has changed over time (typically as indicated by a decrease in the amount of stray light detected by light detector(s) 80A in comparison to the stored reference value) then controller 39 can automatically adjust the current provided to that LED 52 to compensate for its change in brightness.

A calibration mechanism 90 can also be used to detect failures of LEDs 52. Although LEDs 52 tend to be highly reliable they can fail. Calibration mechanism 90 can detect failure of an LED 52 by detecting no light from LED 52 when controller 39 is controlling LED 52 to be "ON". Certain failure modes of an LED 52 or a row of LEDs 52 may also be detected by LED driving electronics associated with controller 39. If the driving electronics detect that no current, or a current having an unexpected value, is being delivered at a time when current should be passing through one or more LEDs 50 then the driving electronics may generate an error signal detectable by controller 39.

Where controller 39 detects a failure of one or more LEDs 52, controller 39 may compensate for the failure(s) by increasing brightness of one or more neighboring LEDs 52, adjusting the elements of spatial light modulator 20 which correspond to the failed LED 52 to provide greater light transmission, or both. In fault tolerant displays according to this embodiment of the invention, after failure of an LED 52, spill over light from adjacent LEDs 52 illuminates the area corresponding to the failed LED 52 sufficiently to make the image visible in the area.

Where controller 39 is configured to increase the brightness of neighboring LEDs 52, controller 39 may determine the amount of increase based in part upon the image content of the area of spatial light modulator 20 corresponding to the failed LED. If the image content calls for the area to be bright then the brightness of neighboring LEDs may be increased more than if the image content calls for the area to be dark. The resulting image quality will be degraded but catastrophic failure will be avoided.

In some embodiments of the invention each LED 52 is dimmed or turned off during those times when the corresponding elements of spatial light modulator are being refreshed. Some spatial light modulators refresh slowly enough that the refresh can be perceived by a viewer. This causes an undesirable effect called "motion blur".

With proper timing, at those times when each row of spatial light modulator 20 is being refreshed, corresponding LEDs 52 can be off or dimmed. At other times the corresponding LEDs 52 can be overdriven sufficiently that a viewer perceives a desired brightness. The viewer's eye cannot perceive rapid flickering of LEDs 52. Instead, the viewer perceives an average brightness. It is typically desirable to multiplex the operation of LEDs 52. Where LEDs are operated in a multiplexed manner, correcting for motion blur can be performed by synchronizing the multiplexing of LEDs 52 with the refreshing of spatial light modulator 52.

Many alterations and modifications are possible in the practice of this invention. For example:

diffuser 22 and collimator 18 could be combined with one another;

diffuser 22 and collimator 18 could be reversed in order;

multiple cooperating elements could be provided to perform light diffusion and/or collimation;

the function of diffuser 22 could be provided by another element which both diffuses light and performs some other function. In such cases, the other element may be said to comprise a diffuser and an apparatus comprising such an element comprises a diffuser;

the order in screen 23 of second light modulator 20 collimator 18 and diffuser 22 could be varied;

the signal 38A driving first light modulator 16 may comprise the same data driving second light modulator 20 or may comprise different data.

Instead of or in addition to providing measuring light output for fixed calibration currents, calibration mechanisms 78 and/or 90 could adjust current to a LED 52 until the LED 52 provides a desired brightness.

Figure 12:
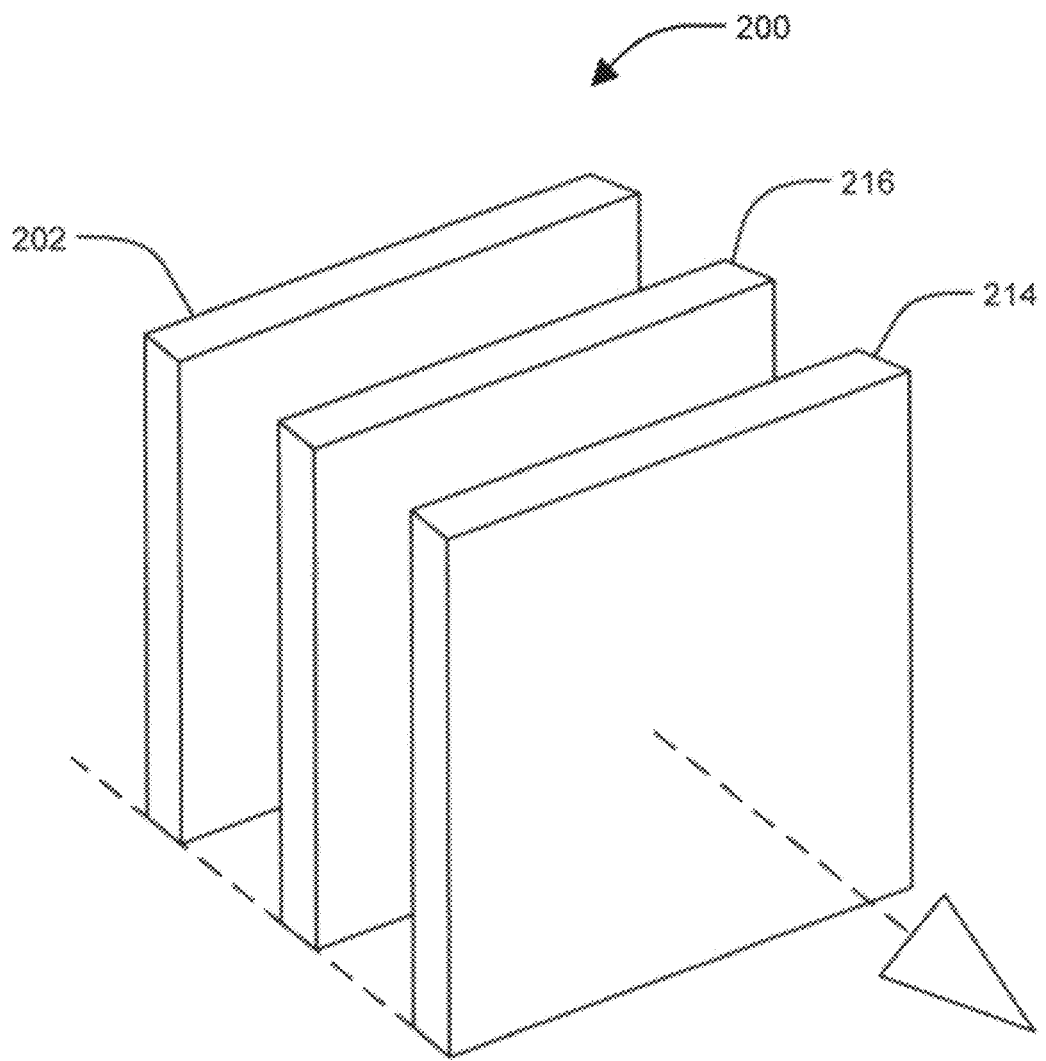
FIG. 12 is a schematic illustration showing a display which is an example of a general type of display discussed in relation to FIGS. 13A to 13D.

A wide range of display configurations are described above. FIG. 12 shows a display 200 according to an example embodiment. Display 200 comprises a light source 202, a spatial light modulator 214 and at least one intermediate spatial light modulator 216. Spatial light modulator 214 may comprise, for example an LCD panel. In some embodiments, spatial light modulator 214 comprises a color spatial light modulator.

Intermediate spatial light modulator 216 has the property that, it is capable of transmitting to spatial light modulator 214 a relatively large portion of the light incident from light source 202. In some embodiments, a transmission coefficient T is given by:

$$T = \frac{I_T}{I_I} \qquad (2)$$

where $I_I$ is the intensity of light incident on intermediate spatial light modulator 216 and $I_T$ is the intensity of light that is passed by intermediate spatial light modulator 216. In general, T can be made to vary on a pixel-by-pixel basis by supplying appropriate control signals to intermediate spatial light modulator 216. In such embodiments, the maximum transmission coefficient $T_{MAX}$ may represent the maximum value of T for any allowed control signals (i.e. intermediate spatial light modulator 216 may pass up to $T_{MAX}$ of the light incident on it to spatial light modulator 214. In some embodiments, $T_{MAX}$ exceeds ½. In some embodiments, $T_{MAX}$ exceeds 0.85 (i.e. in such embodiments intermediate spatial light modulator 216 may pass up to 85% or more of the light incident on it to spatial light modulator 214).

Not all spatial light modulators have the property of providing relatively large values for $T_{MAX}$. Spatial light modulator technologies that can provide values of $T_{MAX}$ well in excess of ½ include electrowetting (EW) modulators, dye-doped polymer-stabilized cholesteric texture ("PSCT") modulators, high-transmissivity light valves and some low-contrast liquid crystal displays. In some embodiments, intermediate spatial light modulator 216 comprises a dye-doped PSCT modulator. In some embodiments, intermediate spatial light modulator 216 comprises an EW modulator. In some embodiments, intermediate spatial light modulator 216 comprises another type of spatial light modulator having $T_{MAX}$ in excess of ½ such as a suitable liquid crystal modulator, a suitable array of optical valves, a suitable array of pixels comprising a material having a controllable diffusion or the like.

Displays according to some embodiments comprise two or more intermediate spatial light modulators arranged in series. In preferred embodiments the combined maximum transmissivity of the series-arranged intermediate spatial light modulators 216 is at least ½.

In some embodiments, the pixels of intermediate spatial light modulator 216 are larger than the pixels of spatial light modulator 214. In some embodiments intermediate spatial light modulator 216 is a monochrome modulator. These facilitate maintaining a high $T_{MAX}$ for intermediate spatial light modulator 216.

In some cases, intermediate spatial light modulator 216 has a much smaller contrast ratio than does spatial light modulator 214. For example, spatial light modulator 214 may comprise a transmissive panel having a contrast ratio of a few hundred to one or more whereas intermediate spatial light modulator 216 may have a dynamic range of less than 100:1 in some embodiments. For example, intermediate spatial light modulator 216 may have a contrast ratio of 10:1 or 2:1 in some embodiments. Even such small contrast ratios can be sufficient to provide meaningful improvements to the quality of images displayed on a display 200.

Even in embodiments where intermediate spatial light modulator 216 has a relatively small contrast ratio, the effect of intermediate spatial light modulator 216 on the dynamic range of display 200 may be quite significant. For example, consider the case where spatial light modulator 214 has a dynamic range of 1000:1 and intermediate spatial light modulator 216 has a dynamic range of only 15:1 the dynamic range available by controlling both of spatial light modulator 214 and intermediate spatial light modulator 216 may be as much as 15000:1.

In embodiments where the light output by light source 202 can be controlled (and in particular in embodiments where the spatial distribution of light emitted from light source 202 can be controlled) then the dynamic range available by controlling all of light source 202, spatial light modulator 214 and intermediate spatial light modulator 216 may be higher still.

Additionally, it is not mandatory that the transmissivity of the elements of intermediate spatial light modulator 216 be controllable through its range in a large number of steps. In some embodiments the elements of intermediate spatial light modulator 216 may be switched between a state of relatively high light transmission (preferably a $T_{MAX}$ in excess of ½) and a state of reduced light transmission. In other embodiments, the transmissivity of the elements of intermediate spatial light modulator 216 may be controllable over a range in a number of steps. The number of steps may optionally be smaller than a number of steps over which the elements of spatial light modulator 214 are controllable.

A display having the overall configuration of display 200 may be implemented in a variety of ways. For example, light source 202, intermediate spatial light modulator 216 and spatial light modulator 214 may have various configurations. Three such configurations are illustrated in FIGS. 13A, 13B and 13C.

Figure 13A:
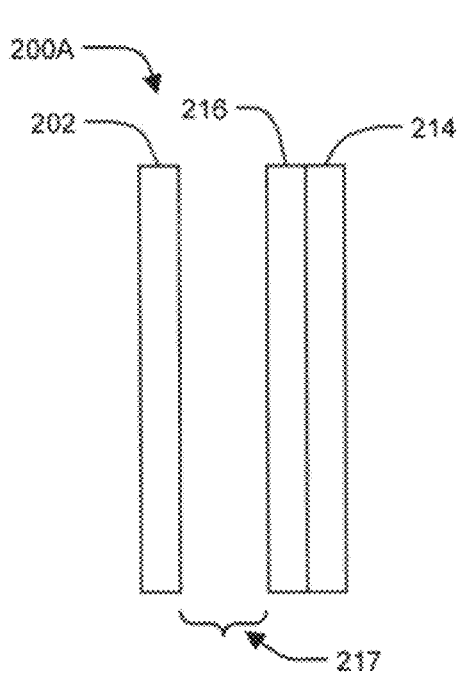
FIG. 13A through 13D are cross sectional schematic views showing configurations of displays according to example embodiments.

FIG. 13A is a cross sectional view of a display 200A in which intermediate spatial light modulator 216 is directly against or at least very close to spatial light modulator 214. In some such embodiments, spatial light modulator 214 and intermediate spatial light modulator 216 are fabricated on opposing faces of a common substrate or are otherwise fabricated together in one assembly. In some such embodiments, pixels of spatial light modulator 214 and intermediate spatial light modulator 216 may be fabricated to be in registration with one another. For example, one or more pixels of spatial light modulator 214 may be registered to each pixel of intermediate spatial light modulator 216 (or vice versa). In the illustrated embodiment, an optical cavity 217 is provided between light source 202 and intermediate spatial light modulator 216.

Figure 13B:
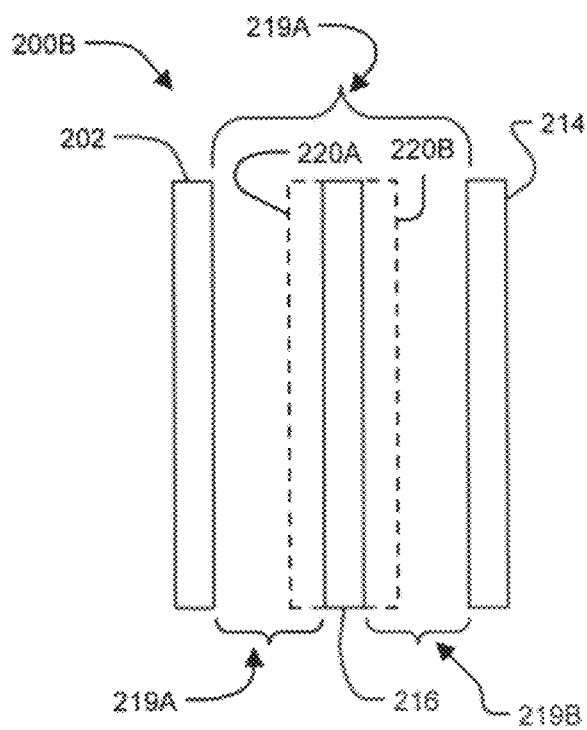
Figure 13C:
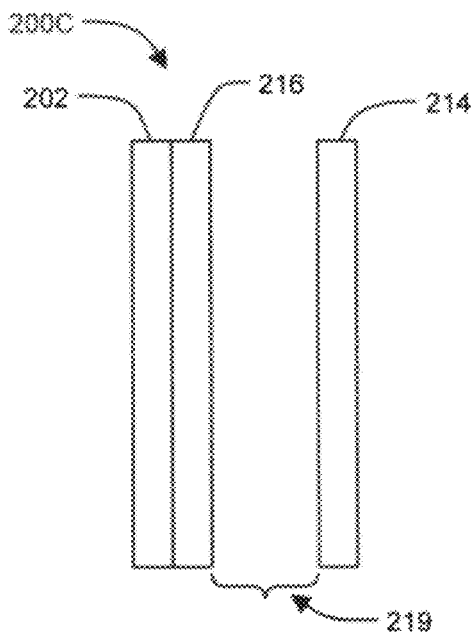

FIG. 13B is a cross sectional view of a display 200B in which light source 202 and spatial light modulator 214 are parallel to one another but spaced apart by a gap 219. Intermediate spatial light modulator 216 is located in gap 219 and is spaced apart from light source 202 by a gap 219A. Intermediate spatial light modulator 216 is spaced apart from spatial light modulator 214 by a gap 219B.

Optical elements of various types may be provided in gaps 219A and/or 219B. FIG. 13B shows optional diffuser sheets 220A and 220B on either side of intermediate spatial light modulator 216.

In some embodiments a diffuser sheet 220B is provided that has a spatial pattern that is registered with the pixels of intermediate spatial light modulator 216. The pattern causes light to be diffused to illuminate areas of spatial light modulator 214 that could otherwise be shadowed by boundaries of the pixels of intermediate spatial light modulator 216. This is particularly advantageous when the width of gap 219B is small.

FIG. 13C is a cross sectional view of a display 200C in which light source 202 and spatial light modulator 214 are parallel to one another but spaced apart by a gap 219. Intermediate spatial light modulator 216 is located directly against or close to light source 202. In some embodiments, intermediate spatial light modulator 216 and light source 202 are integrated with one another in a common assembly. Various example configurations of light source 202 are described herein.

In some embodiments in which light source 202 comprises a plurality of independently-controllable elements, pixels of intermediate spatial light modulator 216 are registered with the independently-controllable elements. In some such embodiments a plurality of pixels of intermediate spatial light modulator 216 independently modulate light from each of the independently-controllable elements of light source 202. In other example embodiments, one or more of the independently-controllable elements may be aligned to illuminate each pixel of intermediate spatial light modulator 216.

Figure 13D:
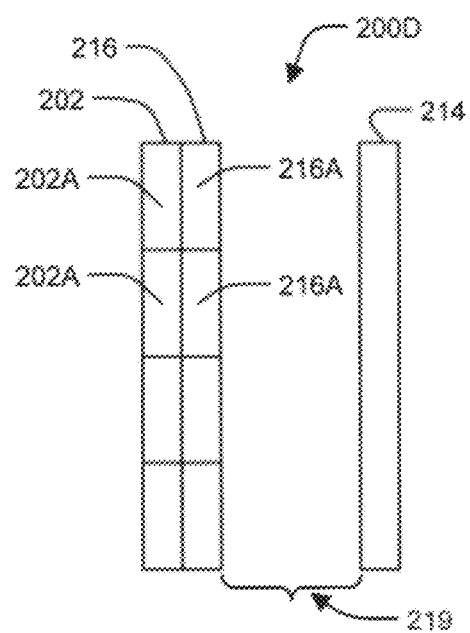

FIG. 13D is a cross sectional view of a display 200D which is similar to display 200C with the exception that light source 202 is shown to comprise a plurality of separate modules 202A. Intermediate spatial light modulator 216 modulates light from light source 202. In the illustrated embodiment, intermediate spatial light modulator 216 itself comprises a plurality of modules 216A. Each module 216A of intermediate spatial light modulator 216 is associated with a corresponding module 202A of light source 202. In some embodiments, modules 216A of intermediate spatial light modulator 216 and modules 202A of light source 202 are combined into integrated assemblies.

Figure 14:
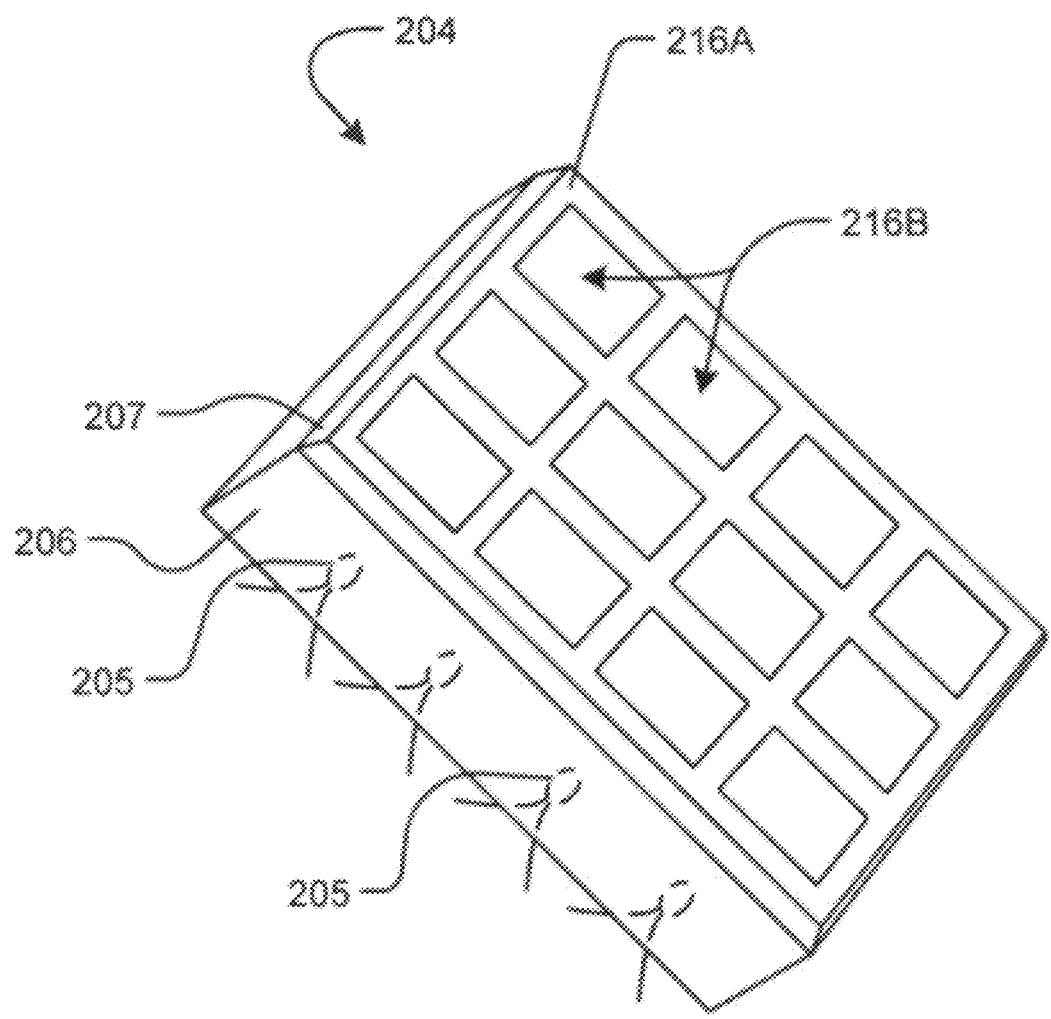
FIG. 14 is an isometric view showing a light-emitting tile.

In one example embodiment, light source 202 comprises a plurality of illumination tiles such as the tile 204 illustrated in FIG. 14. Tiles 204 each comprise one or more light emitting devices 205 (such as, for example, light-emitting diodes) and a waveguide 206 that distributes light emitted by the light emitting devices and emits the light from a face 207 of tile 204. In some embodiments, waveguide 206 and light-emitting devices 205 are arranged to provide even illumination over face 207.

Advantageously, tiles 204 may be independently-controlled but this is not mandatory in all embodiments. In the illustrated embodiment, tile 204 supports a module 216A of intermediate spatial light modulator 216 on or adjacent to face 207. Module 216A may have a suitable number of pixels 216B. For example, in some embodiments, module 216A comprises a rectangular array containing in the range of 4 to 90 pixels. In example embodiments, each tile 204 supports a portion of intermediate spatial light modulator 216 having, for example, a 4-by-4 or 8-by-8 array of pixels.

Tiles 204 may cover an area that is substantially co-extensive with spatial light modulator 214.

Light source 202 may have various constructions. In some embodiments, light source 202 may have a fixed output (the fixed output is not necessarily uniform over the area of light source 202 intermediate spatial light modulator 216). For example, light source 202 may comprise an electroluminescent (EL) panel, one or more plasma light emitters, one or more fluorescent lamps (such as cold cathode fluorescent lamps or hot cathode fluorescent lamps), one or more LEDs or the like. Where light source 202 comprises a plurality of small-area light emitters then the light emitters may be arranged in a suitable array such as a rectangular, square, triangular, or hexagonal array, for example.

In embodiments where light source 202 has a light output that is fixed but not completely uniform, a controller of a display 200 may take into account such non-uniformity and may compensate for the non-uniformity by adjusting the transmission of pixels of intermediate spatial light modulator 216 and/or spatial light modulator 214. To facilitate such control, a map may be provided. The map may comprise a data set that contains data specifying how the light output of light source 202 varies with position. In some embodiments, the map is provided on a memory that is integrated with the light source 202.

Where light source 202 comprises a plurality of independently-controllable light-emitting elements 203 it can be desirable in some cases to keep the number of independently-controllable light-emitting elements reasonably small. This may reduce cost in some cases, for example. In some example embodiments the number of independently-controllable light emitters is less than a few hundred.

In an example embodiment having a fairly small number of independently-controllable light-emitting elements, light source 202 may comprise from a few to a few hundred light-emitting elements. This may be far fewer than the number of pixels of spatial light modulator 214. For example, in some embodiments, spatial light modulator 214 comprises hundreds of thousands or millions of pixels. In such embodiments, providing an intermediate spatial light modulator 216 having a number of pixels that is between the number of independently-controllable elements of light source 202 and the number of pixels of spatial light modulator 214 can help to reduce artifacts that may arise from or be enhanced as a result of the relatively small number of independently-controllable light emitters in light source 202.

Figure 15:
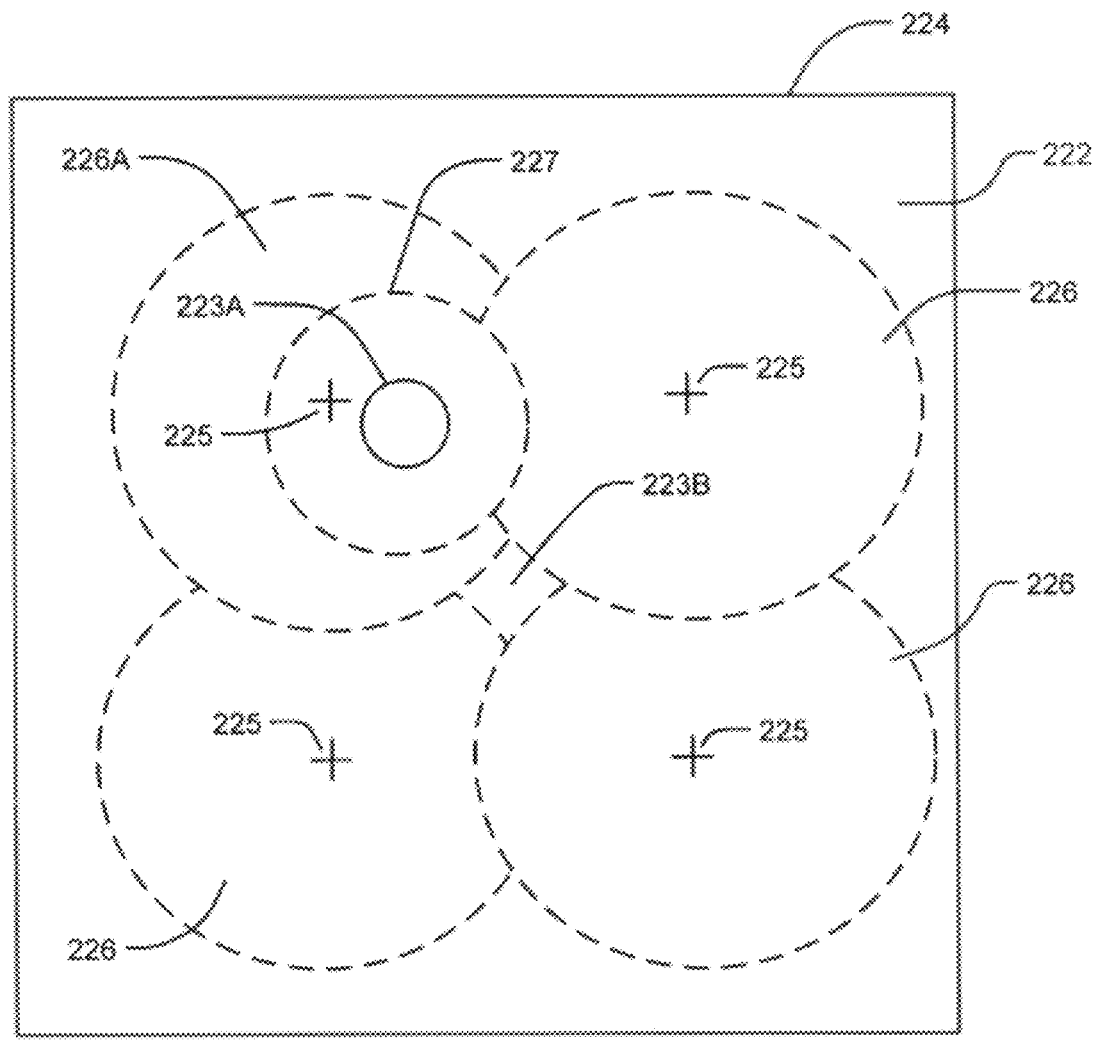
FIG. 15 is an illustration showing a halo artifact.

Consider, for example the halo artifact illustrated in FIG. 15 which shows a portion of an image 222 being displayed on a screen 224 of a display. Image 222 comprises a small but very bright object 223A on a dark background 223B. Crosses 225 illustrate the centers of light distributions 226 from individually-controllable elements 203 of a light source 202. Object 223A is located in a region illuminated primarily by light distribution 226A. It can be appreciated that achieving a desired brightness of object 223A may require light distribution 226A to be made very bright. This can result in a perceptible halo 227 surrounding object 223A.

Even though pixels of spatial light modulator 214 may be in their minimally-transmissive states outside of object 223A, enough of the light from light distribution 226A can shine through to make the pixels corresponding to halo 227 perceptibly brighter than pixels illuminated primarily by other light distributions. An intermediate spatial light modulator may be controlled to reduce the amount of light incident on spatial light modulator 214 outside of the area of object 226A, thereby reducing the visibility of halo 227.

Control of a display that incorporates an intermediate spatial light modulator may be achieved in various ways. In embodiments where light source 202 has a fixed output, control may be achieved substantially as described above, for example.

Some non-limiting examples of general approaches that may be implemented in a controller for a display like display 200 are described in:
  WO02/069030 entitled HIGH DYNAMIC RANGE DISPLAY DEVICES;
  WO03/077013 entitled HIGH DYNAMIC RANGE DISPLAY DEVICES;
  WO 2006/010244 entitled RAPID IMAGE RENDERING ON DUAL-MODULATOR DISPLAYS;
  U.S. 61/105,419 filed on 14 Oct. 2008 and entitled: BACKLIGHT SIMULATION AT REDUCED RESOLUTION TO DETERMINE SPATIAL MODULATIONS OF LIGHT FOR HIGH DYNAMIC RANGE IMAGES;
which are hereby incorporated herein by reference.

Figure 16:
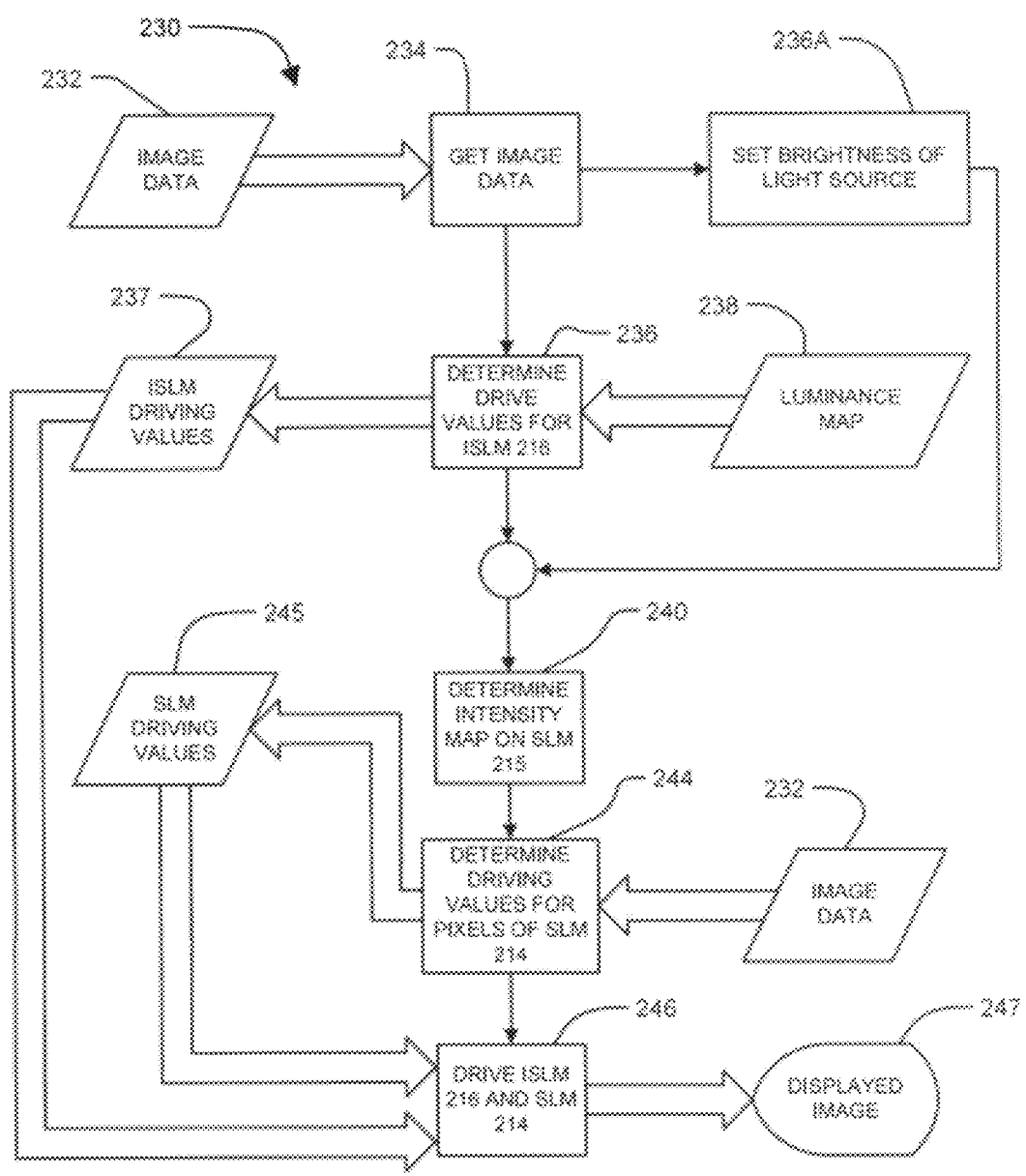
FIGS. 16 and 17 are flowcharts illustrating methods for driving display components according to example embodiments.

FIG. 16 is a flowchart illustrating a method 230 for controlling an intermediate spatial light modulator 216 and a spatial light modulator 214 to display an image as specified by image data 232. Image data 232 indicates a desired luminance for an image area corresponding to each of the pixels of the spatial light modulator 214. In block 234 image data 232 specifying a desired image is obtained.

In block 236 driving values 237 for pixels of intermediate spatial light modulator 216 are determined from image data 232. In the illustrated embodiment block 236 determines driving values 237 based in part on a luminance map 238 containing values from which can be determined an intensity of light incident from light source 202 on each pixel of intermediate spatial light modulator 216. A luminance map 238 may be static, defined by characteristics of light source 202.

Optionally, in block 236A an overall intensity level is set for light source 202. Block 236A may, for example, comprise setting the intensity level for light source 202 based on the intensities specified in image data 232 for the brightest pixels in the image. For example, the intensity level could be set based on the intensities specified (or the average intensity of) a top quartile or top few percent of the intensities specified by image data 232. A smoothing filter may be applied to avoid sudden large changes in the intensity of light source 202.

Ideally the pixels of intermediate spatial light modulator 216 are set such the intensity of light reaching each pixel of spatial light modulator 214 is somewhat greater than the desired intensity at that pixel as specified by image data 232. When this ideal condition holds then the display can display the desired image by moderately attenuating the light incident on each pixel of spatial light modulator 214.

Various algorithms may be applied to obtain driving values 237. For example, an approximation of the desired image may be derived from image data 232 and driving values 237 may be obtained directly from or derived from the approximation. The approximation may be generated, for example, by down-sampling image data 232, low-pass filtering image data 232, taking averages or weighted averages of pixel values within image areas specified by image data 232 or the like.

Block 240 determines the light intensity at pixels of spatial light modulator 214 that would arise from applying driving values 237 to intermediate spatial light modulator 216. Block 240 may comprise, for example, performing a numerical simulation modelling the behaviour of light emitted by each pixel of intermediate spatial light modulator 216 based upon known properties of the optical path between intermediate spatial light modulator 216 and spatial light modulator 214 and the known response of the pixels of intermediate spatial light modulator 216 to driving values 237. For example, the intensity of light emitted by each pixel of intermediate spatial light modulator 216 may be determined from the corresponding driving values 237 (and, if applicable, luminance map 238), suitable point spread functions may be applied to model the distribution of that light on spatial light modulator 214. Contributions to the illumination of pixels of spatial light modulator 214 arising from pixels of intermediate spatial light modulator 216 may be summed to arrive at a luminance map indicating the intensity of light incident on each pixel of spatial light modulator 214.

In embodiments wherein the optical arrangement is such that light incident on spatial light modulator 214 varies smoothly with position (e.g. where point-spread functions for the pixels of intermediate spatial light modulator 216 are smoothly-varying and overlap at spatial light modulator 214) then block 240 may be performed at a resolution lower than that of the pixels of spatial light modulator 214. The intensity of light at individual pixels of spatial light modulator 214 may then be determined by interpolation or upsampling the results of block 240. In some embodiments, block 240 generates estimates of the inverse of the amount of light reaching the pixels of spatial light modulator 214.

In block 244, driving values for pixels of spatial light modulator 214 are determined. Block 244 may comprise, for example, determining a driving value for each pixel of spatial light modulator 244 that would result in the light transmitted by the pixel matching image data 232. Block 244 may comprise, for example, multiplying the intensity specified in image data 232 for a pixel by a scaling factor comprising the inverse of the light incident on the pixel (or equivalently dividing the specified intensity by the light estimated to be incident on the pixel) and then determining a driving value for the pixel based on the result of this computation. The driving value may be determined using a function modelling the response of the pixel or a lookup table for example. In this manner, driving values 245 for the pixels of spatial light modulator 214 may be determined.

In block 246, driving values 245 are applied to spatial light modulator 214 and driving values 237 are applied to control the pixels of intermediate spatial light modulator 216 while light source is turned on. This results in the display of an image 247 for viewing by a viewer.

Figure 17:
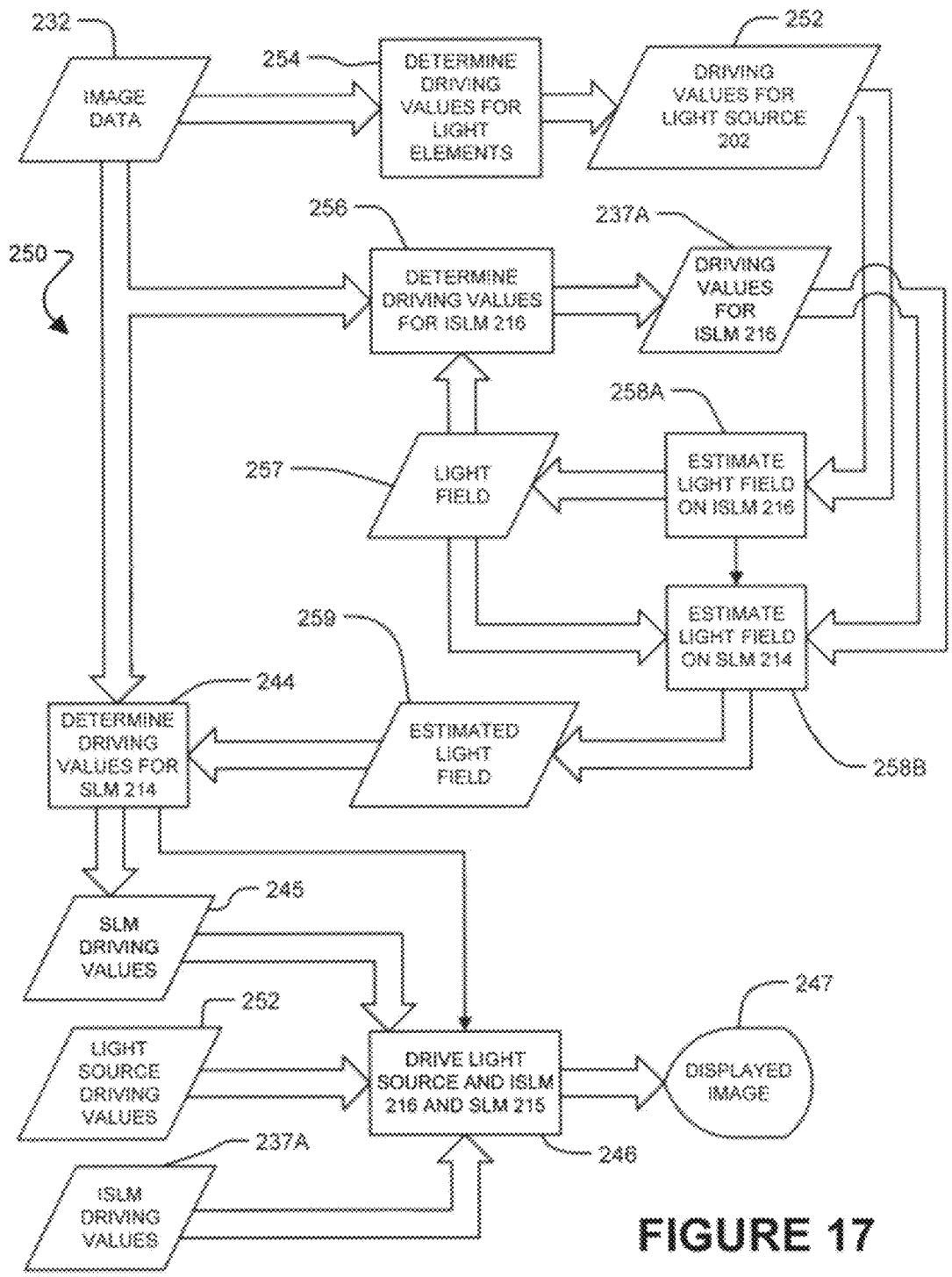

FIG. 17 illustrates a control method 250 that is similar to method 230 but is applicable to the case where light source 202 comprises individually-controllable light-emitting elements such that the spatial distribution of light emitted by light source 202 may be varied. Method 250 differs from method 230 in that driving values 252 are determined for the elements of light source 202 in addition to driving values 237 for the pixels of intermediate spatial light modulator 216. After driving values 252 and 237A have been determined, method 250 may determine driving values for the pixels of spatial light modulator 214 as described above. Method 250, as illustrated, includes blocks 244, 245, 246 and 247 which may be essentially as described above, for example.

In block 254, method 250 determines driving values for light-emitting elements 203 of light source 202. Block 254 may comprise, for example generating a rough approximation of the desired image from image data 232. Driving values 252 may be obtained directly from or derived from the approximation. The approximation may be generated, for example, by down-sampling image data 232, low-pass filtering image data 232, taking averages or weighted averages of pixel values within image areas specified by image data 232 or the like.

In block 256 method 250 determines driving values 237A for the pixels of intermediate spatial light modulator 216. In some embodiments, block 256 is performed at a resolution higher than the resolution at which the computations of block 254 are performed. In some embodiments, driving values 237A are derived from image data 232 independently of driving values 252. For example, image data may be down-sampled two or more times to arrive at a low-resolution image used to determine driving values 252 by way of one or more intermediate-resolution images. Driving values 237A may be determined from an intermediate-resolution image. Driving values 252 and 237A may be determined in parallel.

In some embodiments, driving values 237A are based in part on driving values 252. For example, a light field simulation may be performed to determine the intensity of light incident on each pixel of intermediate spatial light modulator 216 for a given set of driving values 252. The light field simulation may be performed as described above (block 240 of method 230 for example).

In embodiments where intermediate spatial light modulator is up against or very close to light source 202 the intensity of light incident on pixels of intermediate spatial light modulator 216 may be determined directly from driving values 252. Driving values 237A may then be determined in such a manner that the light that passes intermediate spatial light modulator matches a desired approximation of an image specified in the image data 232. For example, driving values 237A may be set such that the light emitted by each pixel of intermediate spatial light modulator 216 has an intensity slightly greater than that specified in a downsampled or low-pass spatially filtered representation of image data 232.

Regardless of whether or not driving values 237A are determined with reference to driving values 252, a determination of the amount of light incident on pixels of spatial light modulator 214 may be performed in a manner that comprises performing two light field simulations. This can be particularly advantageous in cases where intermediate spatial light modulator 216 is spaced apart from each of light source 202 and spatial light modulator 214 as illustrated, for example, in FIG. 13B.

For example, FIG. 17 shows block 258A in which a first light field simulation is performed and block 258B in which a second light field simulation is performed. The first light field simulation takes as input driving values 252 and may determine light field 257 by determining the light incident on each pixel of intermediate spatial light modulator 216 based on the known geometries and locations of individual light-emitting elements 203 and the point spread functions that characterize the way in which light from each of light-emitting elements 203 becomes distributed over intermediate spatial light modulator 216.

A second light field simulation may then be performed. The second light field simulation takes as inputs the illumination information from the first light field simulation and driving values 237A. The second light field simulation may determine estimated light field 259 by determining the light incident on each pixel of spatial light modulator 214 based on the known geometries and locations of individual pixels of intermediate spatial light modulator 216 and the point spread functions that characterize the way in which light from each of these pixels becomes distributed over spatial light modulator 214.

Figure 18:
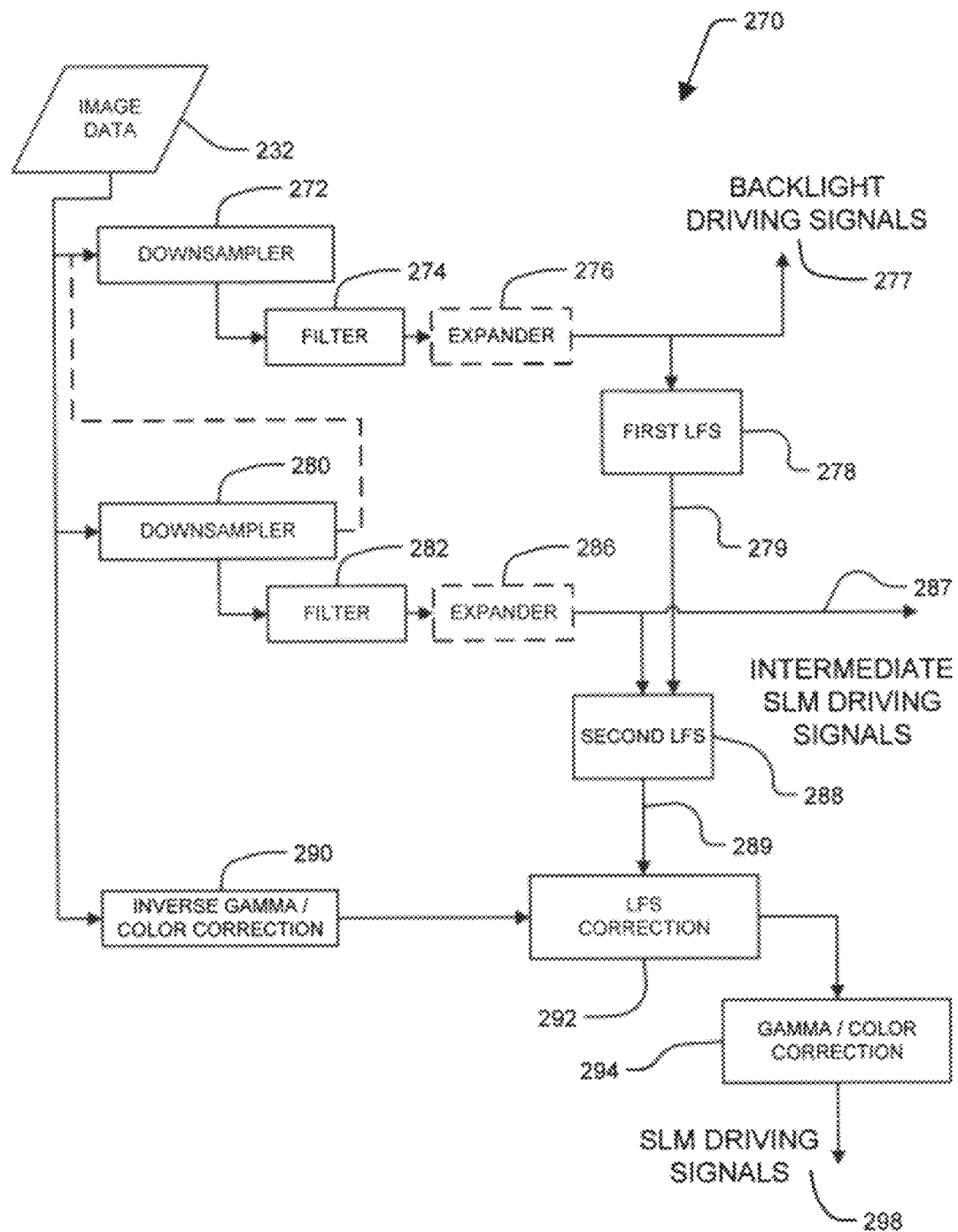
FIG. 18 is a block diagram illustrating an alternative control system that may be applied to control displays having an intermediate spatial light modulator.

FIG. 18 illustrates schematically an alternative example control system 270 for a display like display 200. Control system 270 may be embodied as a set of modules (which may each be implemented in hardware and/or software). Control system 270 may be implemented as hard-wired circuits, for example one or more application specific integrated circuits (ASICs), one or more data processors and accompanying software, the processors may comprise, for example, microprocessors, digital signal processors, CPUs, graphics processors or the like, configurable circuits such as field-programmable gate arrays (FPGAs) suitably-configured, a combination of these things, or the like. The flow of information and sequence of processes performed by control system 270 also provides a method for control of a display.

Control system 270 receives image data 232. A downsampler 272 downsamples the image data to the spatial resolution of a backlight (e.g. 202). As an alternative to downsampling image data 232 directly, downsampler 272 may receive and downsample image data that has already been downsampled by a second downsampler 280, which is described below. The downsampled data is filtered by a filter 274 that may perform spatial and/or temporal filtering. An expander 276 is optionally provided. Expander 276 may, for example, apply a linear or non-linear boost or other correction to the data to produce backlight driving signals 277.

A second downsampler 280 also receives image data 232. Downsampler 280 downsamples the image data to a spatial resolution of an intermediate spatial light modulator (e.g. intermediate SLM 216). The output of downsampler 180 passes to a filter 282 that may perform spatial and/or temporal filtering. An expander 286 is optionally provided. Expander 286 may, for example, apply a linear or non-linear boost or other correction to the data to produce intermediate SLM driving signals 287.

A first light field simulator 278 receives the backlight driving signals 277 as an input and provides a first simulated light field 279 as an output. The data of first simulated light field 279 indicates the amount of light that would be incident on each element of intermediate SLM (e.g. 216) in response to the application of backlight driving signals 277.

As an alternative to deriving intermediate SLM driving signals 287 directly from image data, the image data may be processed to yield data specifying a desired amount of light to be emitted from each element of intermediate spatial light modulator 216. The desired amounts of light may be chosen according to a formula that at least approximately will provide a desired light field at spatial light modulator 214. For example, it may be advantageous for the light incident on spatial light modulator 214 to vary smoothly over the spatial light modulator and to be, in general, somewhat brighter at each pixel of spatial light modulator 214 than the brightness specified by the image data for that pixel (such that the light can be corrected by applying an intermediate driving value to the pixel of the spatial light modulator). When the desired light to be emitted from each element of intermediate spatial light modulator 216 is known, then the intermediate SLM driving signals 287 for the elements of intermediate spatial light modulator 216 may be determined from the first simulated light field, the desired light outputs, and known characteristics of the intermediate spatial light modulator 216.

A second light field simulator 288 receives the first simulated light field 279 and the intermediate SLM driving signals 287 as inputs and provides a second simulated light field 289 as an output. The data of second simulated light field 289 indicates the amount of light that would be incident on each element of a spatial light modulator (e.g. 214) in response to the application of backlight driving signals 277 and the intermediate SLM driving signals 287.

Image data is also provided to a LFS correction module 292 which is connected to receive the second simulated light field 289. The image data may be processed for inverse gamma correction and/or color correction prior to being passed to LFS correction module 292. In the illustrated embodiment, this function is provided by an inverse gamma/color correction module 290. LFS correction module 292 determines, for the elements of a spatial light modulator (e.g. pixels of SLM 214) the amount of attenuation that would be required to be applied to the second simulated light field to produce an output image according to image data 232. The output from LFS correction module 292 is processed by applying any appropriate gamma and/or color correction in gamma/color correction module 294 to yield SLM driving signals 298.

Where display 200 comprises a color display, improved imaging may result if light field simulations are performed separately for different color components of the light. For example, in the case where spatial light modulator 214 has filters which pass light of a number of primary colors (for example, red, green and blue), light field simulations may be performed separately for components of the emitted light that will pass through the red-green and blue filters respectively. In some embodiments, the first and second light field simulations described above each comprise a plurality of light field simulations for a plurality of different spectral components. In some embodiments, the light field simulations may be based upon separate color spectra for different light emitters of light source 202. In other embodiments all light emitted by light source 202 may be assumed to have a given spectral composition.

It is not mandatory that intermediate spatial light modulator 216 controls light intensity directly. Intermediate spatial light modulator 216 may control some other characteristic of light that alters the effective intensity of the light. For example, in some cases spatial light modulator 214 may pass only light that is incident with a particular polarisation. In some embodiments, pixels of intermediate spatial light modulator 216 may control the polarization of transmitted light, thereby affecting the proportion of the transmitted light that will pass through spatial light modulator 214.

In some embodiments intermediate spatial light modulator 216 may be updated at a different rate from spatial light modulator 214 and/or light source 202. For example, in some embodiments intermediate spatial light modulator 216 may be updated at a rate on the order of 30 Hz while light source 202 may be updated at a higher rate, such as a rate on the order of 120 Hz. This arrangement can permit the application of an intermediate spatial light modulator 216 having a greater latency that would otherwise be practical.

In some embodiments where a display as described herein is applied to display a sequence of frames of video data, intermediate spatial light modulator 216 may be updated at a rate that is slower than the frame rate. For example, intermediate spatial light modulator 216 may be updated once for every 2, 3 or 4 frames of data. For frames in which intermediate spatial light modulator 216 is not updated, refinement of the displayed image may be achieved by updating driving values for light source 202 (or individual elements of light source 202 is so equipped) and/or spatial light modulator 214.

Certain implementations of the invention comprise computer processors which execute software instructions which cause the processors to perform a method of the invention. For example, one or more processors in a display or in a system that generates driving signals for a display may implement methods such as those described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

The invention may also be implemented in suitably configured logic circuits such as suitably configured field-programmable gate arrays and/or hard-wired logic circuits. In an example embodiment, such logic circuits are provided in an image processing unit, which may comprise a video processing unit for use in or with a display.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, features of different ones of the example embodiments described in the above description and/or illustrated in the drawings can be combined with one another to yield other example embodiments. Accordingly, the scope of the invention is to be construed in accordance with the substance defined by the following claims.

What is claimed is:

1. A display comprising:
a light source comprising a two-dimensional array of light-emitting elements each having a controllable light output and the controller is configured to generate driving values for the light-emitting elements based at least in part on image data to display an image specified by the image data;
a spatial light modulator comprising a plurality of controllable elements located to modulate light from the light source, each of the plurality of controllable elements having a controllable transmissivity;
an intermediate spatial light modulator comprising a plurality of controllable elements, located in a light path between the light source and the spatial light modulator, each of the plurality of controllable elements of the intermediate spatial light modulator having a controllable transmissivity, the intermediate spatial light modulator characterized by a maximum transmissivity of at least ½; and
a controller configured:
to control the controllable elements of the spatial light modulator and the controllable elements of the intermediate spatial light modulator in to response the image data to display an image specified by the image data, and
to estimate first light intensities at the controllable elements of the intermediate spatial light modulator based on the driving values for the light-emitting elements.

2. A display according to claim 1 wherein the controllable elements of the intermediate spatial light modulator comprises electro-wetting light valves.

3. A display according to claim 1 wherein the controllable elements of the intermediate spatial light modulator comprise dye-doped PSCT elements.

4. A display according to claim 1 wherein the controller is configured to estimate the first light intensities by, for each of the first light intensities, combining contributions to the first light intensity from a plurality of the light-emitting elements.

5. A display according to claim 1 wherein the controller is configured to estimate second light intensities at the controllable elements of the spatial light modulator based on the estimated first light intensities and driving values for the elements of the intermediate spatial light modulator.

6. A display according to claim 5 wherein the controller is configured to estimate the second light intensities by, for each of the second light intensities, combining contributions to the second light intensity from a plurality of the controllable elements of the intermediate spatial light modulator.

7. A display according to claim 1 wherein the controller is configured to generate the driving values for the elements of the intermediate spatial light modulator based at least in part upon the estimated first light intensities.

8. A display according to claim 1 wherein the controller is configured to generate the driving values for the elements of the intermediate spatial light modulator based at least in part upon the image data.

9. A display comprising:
a light source comprising a two-dimensional array of light-emitting elements each having a controllable light output and the controller is configured to generate driving values for the light-emitting elements based at least in part on image data to display an image specified by the image data;
a spatial light modulator comprising a plurality of controllable elements located to modulate light from the light source, each of the plurality of controllable elements having a controllable transmissivity;
an intermediate spatial light modulator comprising a plurality of controllable elements, located in a light path between the light source and the spatial light modulator, each of the plurality of controllable elements of the intermediate spatial light modulators having a controllable transmissivity, the intermediate spatial light modulator characterized by a maximum transmissivity of at least ½; and
a controller configured:
to control the controllable elements of the spatial light modulator and the controllable elements of the intermediate spatial light modulator in to response the image data to display an image specified by the image data, and
to update the driving values for the light-emitting elements at a first frequency and to update the driving values for the controllable elements of the intermediate spatial light modulator at a second frequency different from the first frequency.

10. A display according to claim 9 wherein the image data comprises video data defining a sequence of video frames and the controller is configured to update the driving values for the light emitting elements in each frame and to update the driving values for the controllable elements of the intermediate spatial light modulator less often than every frame.

11. A display according to claim 10 wherein the intermediate spatial light modulator comprises a plurality of modules each module comprising a plurality of pixels of the spatial light modulator wherein each of the tiles illuminates the pixels of one of the modules.

12. A display comprising:
a light source comprising a two-dimensional array of light-emitting elements each having a controllable light output and the controller is configured to generate driving values for the light-emitting elements based at least in part on the image data;
a spatial light modulator comprising a plurality of controllable elements located to modulate light from the light source, each of the plurality of controllable elements having a controllable transmissivity;
an intermediate spatial light modulator comprising a plurality of controllable elements, located in a light path between the light source and the spatial light modulator, each of the plurality of controllable elements of the intermediate spatial light modulators having a controllable transmissivity, the intermediate spatial light modulator characterized by a maximum transmissivity of at least ½;
a controller configured to control the controllable elements of the spatial light modulator and the controllable elements of the intermediate spatial light modulator in response to image data to display an image specified by the image data;
wherein the light-emitting elements each comprise a tile comprising one or more light-emitting devices and a waveguide, the waveguide configured to emit light from the light-emitting devices on a face thereof.

13. A display comprising:
a light source comprising no more than 400 light-emitters;
a spatial light modulator comprising a plurality of controllable elements located to modulate light from the light source, each of the plurality of controllable elements having a controllable transmissivity;
an intermediate spatial light modulator comprising a plurality of controllable elements, located in a light path between the light source and the spatial light modulator, each of the plurality of controllable elements of the spatial light modulator having a controllable transmissivity, the intermediate spatial light modulator characterized by a maximum transmissivity of at least ½;
a controller configured to control the controllable elements of the spatial light modulator and the controllable elements of the intermediate spatial light modulator in response to image data to display an image specified by the image data;
wherein the controllable elements of the intermediate spatial light modulator comprise dye-doped polymer-stabilized cholesteric texture ("PSCT") elements.

14. A display comprising:
a light source;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator; and
wherein the control system is configured to refresh the first spatial light modulator at a first rate and to refresh the intermediate spatial light modulator at a second rate different from the first rate.

15. A display according to claim 14 wherein the second rate is less than the first rate.

16. A display according to claim 15 wherein the image data comprises video data and the second rate is less than a frame rate of the video data.

17. A display according to claim 14 wherein the intermediate spatial light modulator is characterized by a maximum transmissivity of at least ½.

18. A display according to claim 17 wherein the intermediate spatial light modulator is characterized by a maximum transmissivity of 0.85 or more.

19. A display according to claim 17 wherein the light source, intermediate spatial light modulator and spatial light modulator are equal in area and parallel to one another.

20. A display according to claim 14 wherein the intermediate spatial light modulator has a contrast ratio of 10:1 or lower.

21. A display according to claim 14 wherein the intermediate spatial light modulator is spaced apart from the first spatial light modulator by a first gap.

22. A display according to claim 21 wherein the light source, intermediate spatial light modulator and spatial light modulator are equal in area and parallel to one another.

23. A display according to claim 21 wherein the intermediate spatial light modulator is spaced apart from the light source by a second gap.

24. A display according to claim 14 wherein the light source comprises a plurality of light emitters and the intermediate spatial light modulator is arranged so that light from each of the light emitters of the light source is modulated by a plurality of the pixels of the intermediate spatial light modulator.

25. A display comprising:
a light source;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator; and
wherein the pixels of the intermediate spatial light modulator are larger than the pixels of the first spatial light modulator.

26. A display according to claim 25 wherein the first spatial light modulator has more pixels than does the intermediate spatial light modulator.

27. A display comprising:
a light source;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator; and
wherein the intermediate spatial light modulator and first spatial light modulator are supported by a common substrate.

28. A display according to claim 27 wherein the first spatial light modulator is supported on a first face of the common substrate and the intermediate spatial light modulator is supported on a second face of the common substrate.

29. A display comprising:
a light source;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator; and
an optical diffuser element;
wherein the control system is configured to control pixels of the intermediate spatial light modulator at least in part in response to the image data to provide or refine an approximation of the desired image on the first spatial light modulator;
wherein the intermediate spatial light modulator is spaced apart from the first spatial light modulator by a first gap;
wherein the intermediate spatial light modulator is spaced apart from the light source by a second gap; and
wherein the optical diffuser element is located in at least one of the first and second gaps.

30. A display comprising:
a light source;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator;
wherein the intermediate spatial light modulator is spaced apart from the first spatial light modulator by a first gap;
wherein the intermediate spatial light modulator is spaced apart from the light source by a second gap; and
an optical element in at least one of the first and second gaps wherein an optical characteristic of the optical element varies according to a spatial pattern that is registered relative to the pixels of the intermediate spatial light modulator.

31. A display according to claim 30 wherein the optical element comprises a diffuser and the optical characteristic is a coefficient characterizing diffusion of light by the diffuser.

32. A display comprising:
a light source comprising a plurality of light-emitting tiles, the plurality of tiles each comprising one or more light emitters having optical outputs coupled to a waveguide arranged to distribute light from the one or more light emitters over an area of the tile;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator.

33. A display according to claim 32 wherein the intermediate spatial light modulator comprises a plurality of modules wherein each one of the plurality of modules is associated with and arranged to modulate light from a corresponding one of the plurality of tiles.

34. A display according to claim 33 wherein each module of the spatial light modulator is integrated with a corresponding one of the tiles of the light source.

35. A display according to claim 33 wherein each one of the plurality of modules comprises from 40 to 90 of the pixels of the intermediate spatial light modulator.

36. A display according to claim 35 wherein each one of the plurality of modules comprises an M×N array of the pixels of the intermediate spatial light modulator wherein M and N are integers, M and N are equal or different, and at least one of M and N is a power of 2.

37. A display comprising:
a light source;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator; and
wherein the control system comprises a map, the map providing information regarding non-uniformities in light emission by the light source wherein the control system is configured to adjust driving values for the pixels of the intermediate spatial light modulator to compensate for the non-uniformities.

38. A display comprising:
a light source comprising a plurality of individually-controllable light emitters and the control system is configured to generate light source driving signals for the individually-controllable light emitters based at least in part on the image data;
a first spatial light modulator;
a control system configured to receive image data defining an image to be displayed on the display and to control pixels of the first spatial light modulator in response to the image data;
an intermediate spatial light modulator located in an optical path between the light source and the first spatial light modulator;
wherein the control system is configured to control pixels of the intermediate spatial light modulator at least in part in response to the image data to provide or refine an approximation of the desired image on the first spatial light modulator.

39. A display according to claim 38 wherein the control system is configured to generate a first estimate of light incident from the light source on the intermediate spatial light modulator based at least in part on the light source driving signals and to generate a second estimate of light incident on the first spatial light modulator based at least in part on the first estimate and control values for the pixels of the first spatial light modulator.

40. A display according to claim 38 wherein the control system is configured to generate driving signals for the intermediate spatial light modulator based on the image data.

41. A display according to claim 38 wherein the control system is configured to determine from the image data a desired amount of light to be emitted from each pixel of the intermediate spatial light modulator and to generate driving signals for the intermediate spatial light modulator based on the desired amounts of light.

* * * * *